INVENTOR.
OTIS E. STAPLES
BY Hudson, Boughton,
Williams, David & Hoffmann.
ATTORNEYS INVENTOR.
OTIS E. STAPLES
BY Hudson, Boughton,
Williams, David & Hoffmann.
ATTORNEYS Feb. 8, 1955   O. E. STAPLES   2,701,495
TURNING MACHINE Filed Dec. 29, 1948   14 Sheets-Sheet 4

INVENTOR.
OTIS E. STAPLES
BY Hudson, Boughton,
Williams, David & Hoffmann.
ATTORNEYS Feb. 8, 1955   O. E. STAPLES   2,701,495
TURNING MACHINE
Filed Dec. 29, 1948   14 Sheets-Sheet 5

INVENTOR.
OTIS E. STAPLES
BY Hudson, Boughton,
Williams, David & Hoffmann.
ATTORNEYS Feb. 8, 1955

O. E. STAPLES 2,701,495

TURNING MACHINE

Filed Dec. 29, 1948

INVENTOR.
OTIS E. STAPLES
BY Hudson, Boughton,
Williams, David & Hoffmann.
ATTORNEYS

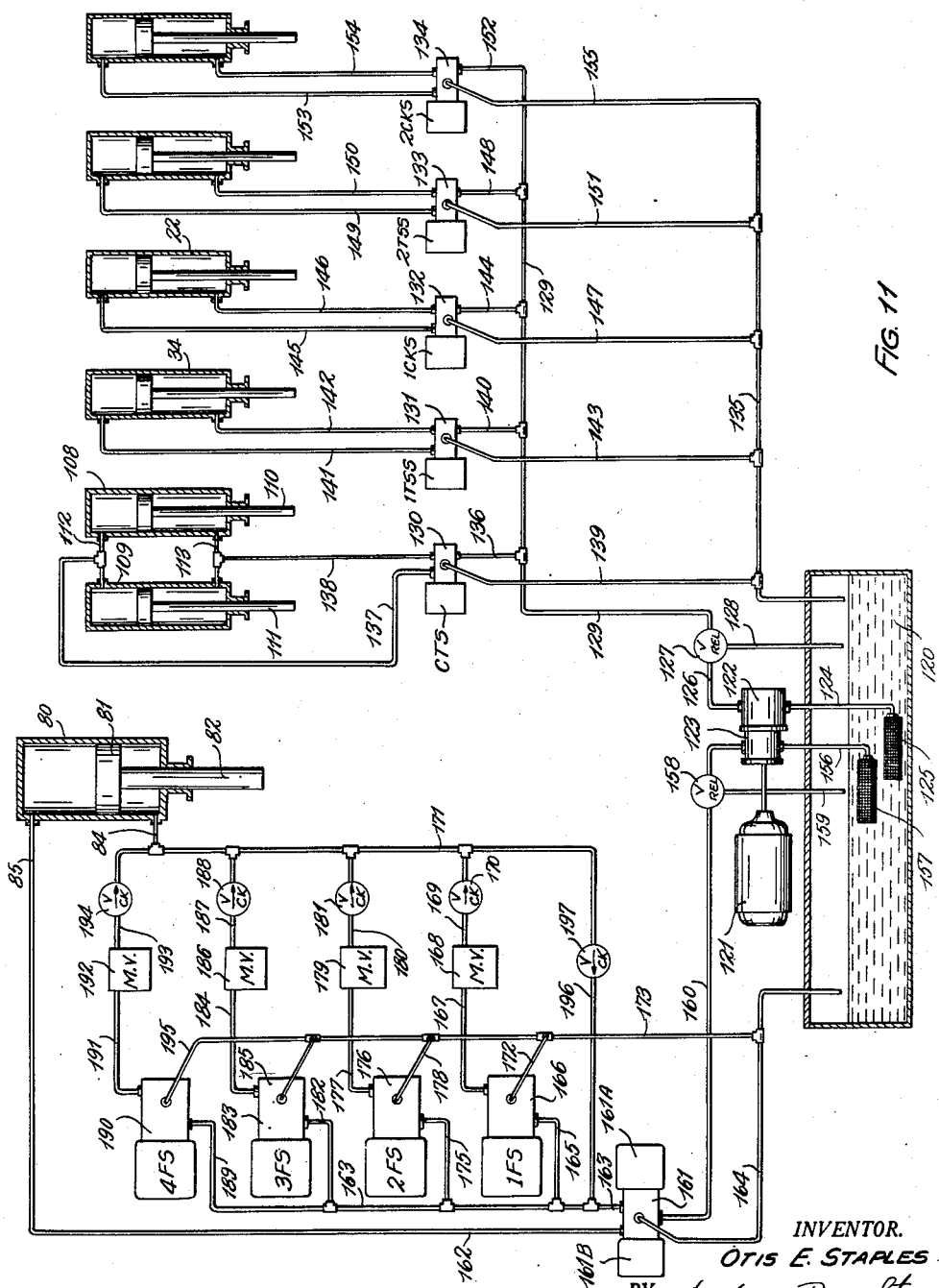

INVENTOR.
OTIS E. STAPLES

Feb. 8, 1955  O. E. STAPLES  2,701,495
TURNING MACHINE

Filed Dec. 29, 1948  14 Sheets-Sheet 10

INVENTOR.
OTIS E. STAPLES
BY Hudson, Boughton,
Williams, David & Hoffmann.
ATTORNEYS

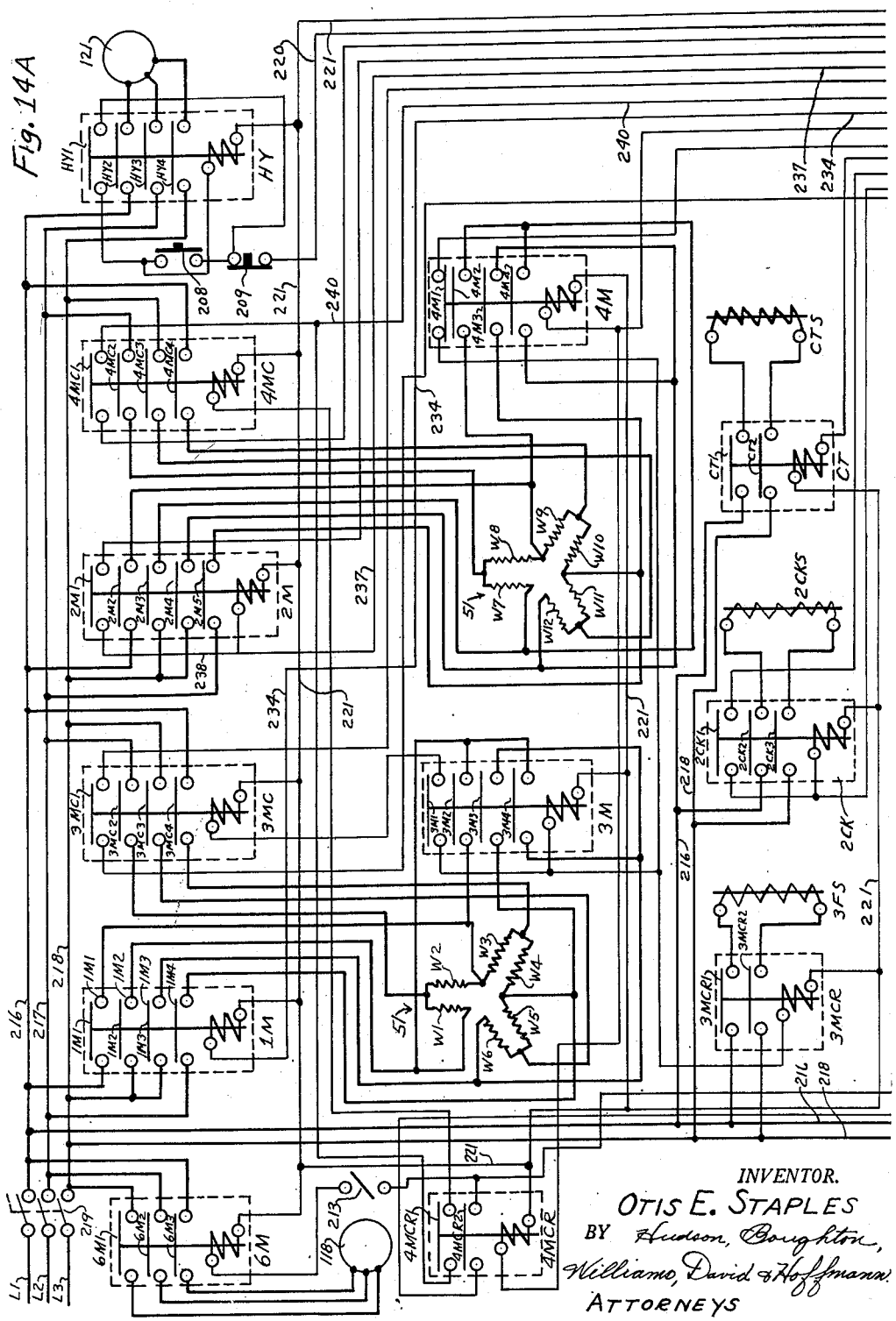

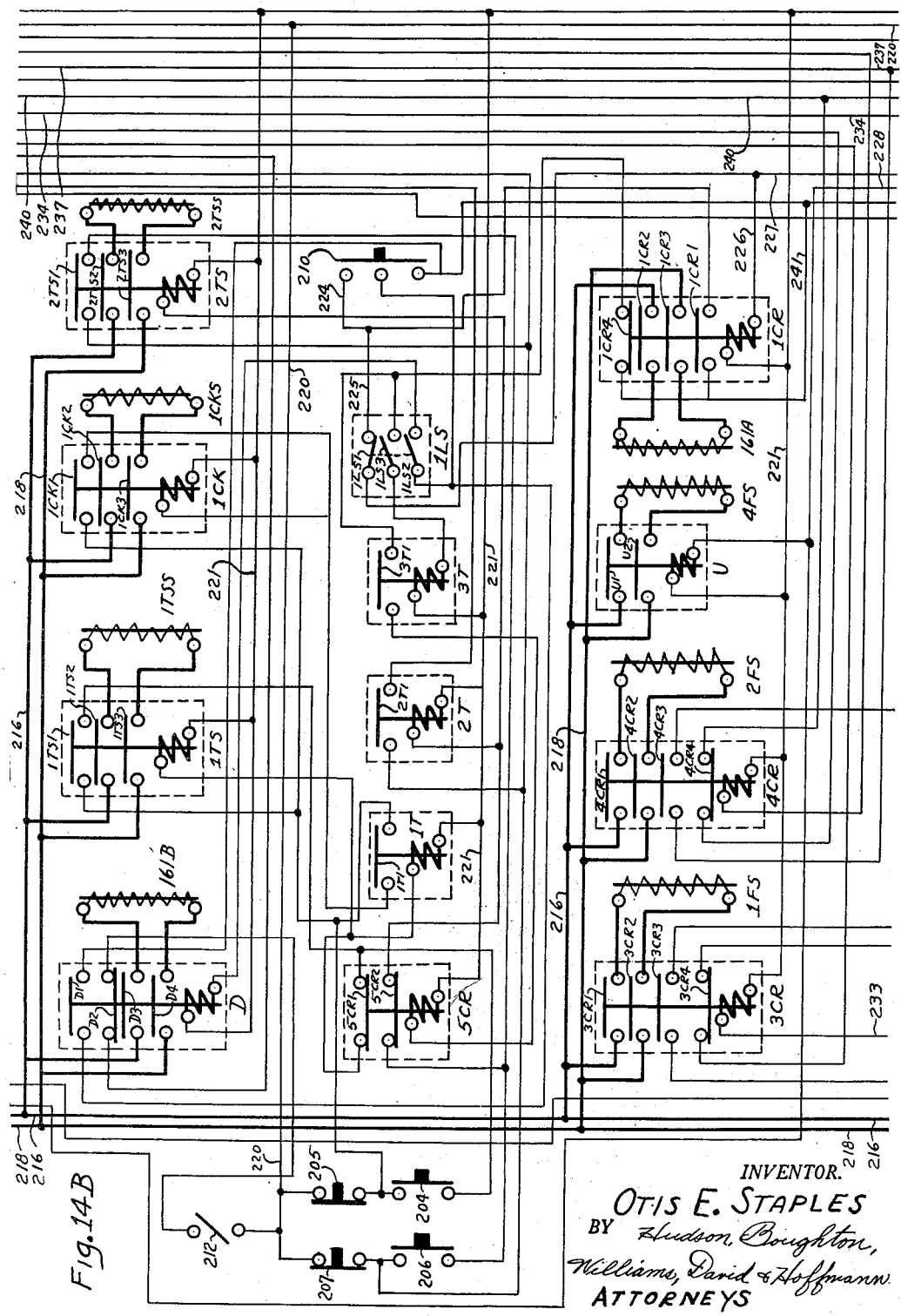

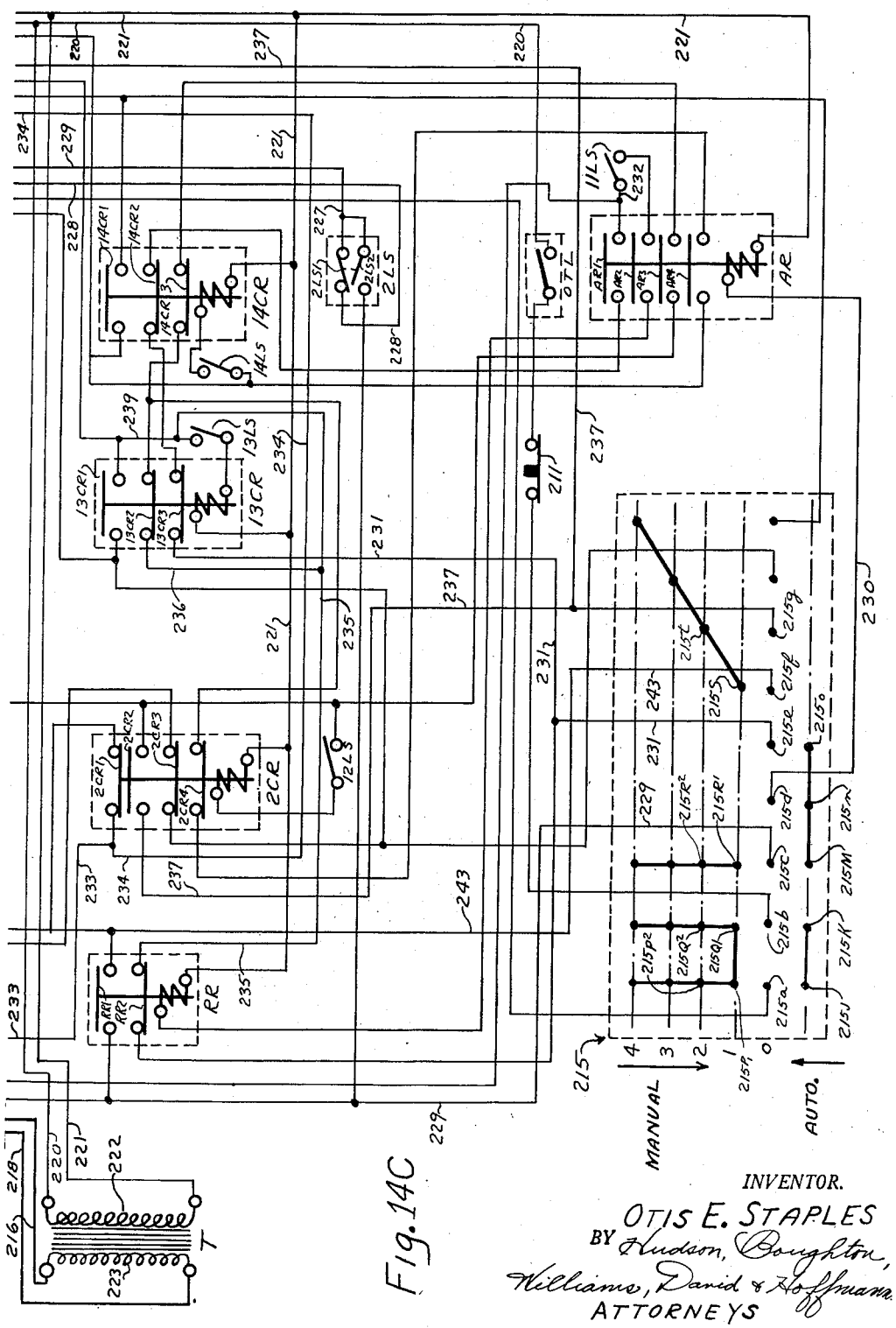

United States Patent Office 2,701,495
Patented Feb. 8, 1955

2,701,495

TURNING MACHINE

Otis E. Staples, Euclid, Ohio, assignor to The Cleveland Hobbing Machine Co., Euclid, Ohio, a corporation of Ohio Application December 29, 1948, Serial No. 68,004

4 Claims. (Cl. 82—3)

The present invention relates to an apparatus for machining metal, plastics, wood, and the like and, more particularly, to machines for turning material in a manner analogous to that disclosed in the Otis E. Staples Patents Numbers 2,341,668 and 2,362,318, issued February 15, 1944 and November 7, 1944, respectively.

The principal object of the present invention is the provision of a novel and improved apparatus for machining metal, plastics, wood, and the like, which is rugged in construction, reliable in operation, and requires a minimum of skill and effort on the part of the operator so that accurate machining operations may be effected by relatively unskilled operators.

Another object of the invention is to provide an improved machine tool for performing machining operations simultaneously upon two workpieces, the machine being so constructed and arranged that both workpieces may be placed in the machine, observed during the machining operation, and removed from the machine by the operator without the necessity of the latter moving from a single convenient station at the machine.

A more specific object of the invention is to provide a machine of the type defined in the preceding object and wherein the workpieces are machined by relative vertical movement between the latter and the tools operating thereon and wherein a portion of the frame of the machine is provided with an opening disposed for easy access to and observation of both workpieces from a single station.

A further object of the invention is to provide an improved machine for effecting machining operations upon workpieces in which the workpieces and the tools are rotated while relative movement between the tools and workpieces longitudinally of the axes of the latter is effected, the supporting of the workpieces in the machine as well as the relative movement between the tools and the workpieces being effected by fluid pressure operated mechanisms.

A still further object of the invention is to provide a novel and improved machine of the type defined in the preceding object and in which the speed of rotation of the workpieces as well as the speed of relative movement between the tools and the workpieces are automatically controlled in accordance with the positions of the tools longitudinally of the workpieces whereby portions of different diameters may be turned upon workpieces without the necessity of intervention by the operator, the machine also including means for enabling the operator to control the operations independently of the automatic control.

The invention further resides in certain novel features of construction and combination and arrangement of parts, and further objects and advantages thereof will be apparent to those skilled in the art to which it pertains from the following description of the present preferred embodiment thereof, described with reference to the accompanying drawings in which similar reference characters represent corresponding parts in the several views and in which:

Fig. 11 is a simplified, somewhat diagrammatic representation of the fluid pressure system employed for actuation and control of the machine;

Figure 12A:
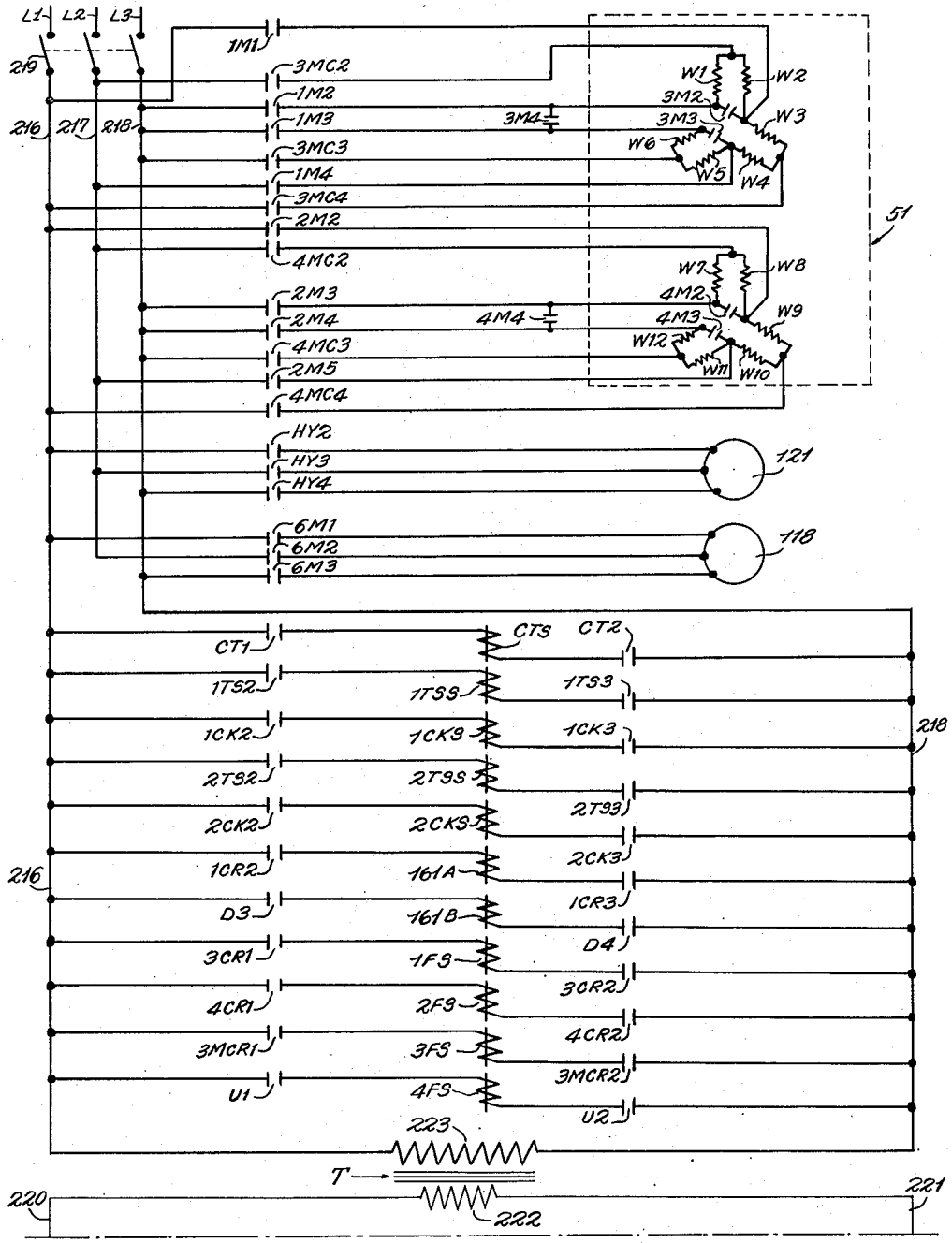
Figure 12B:
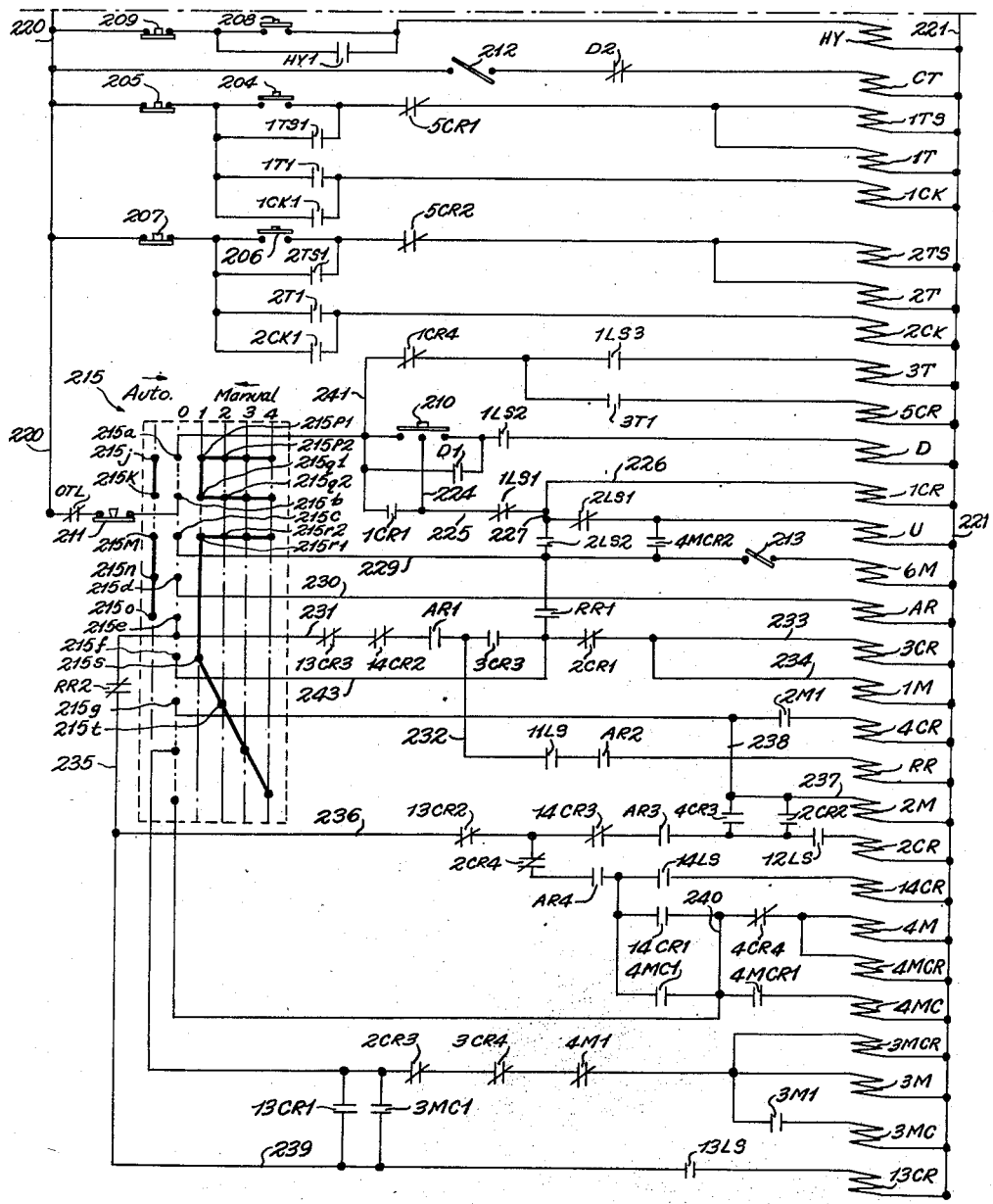
Figure 13A:
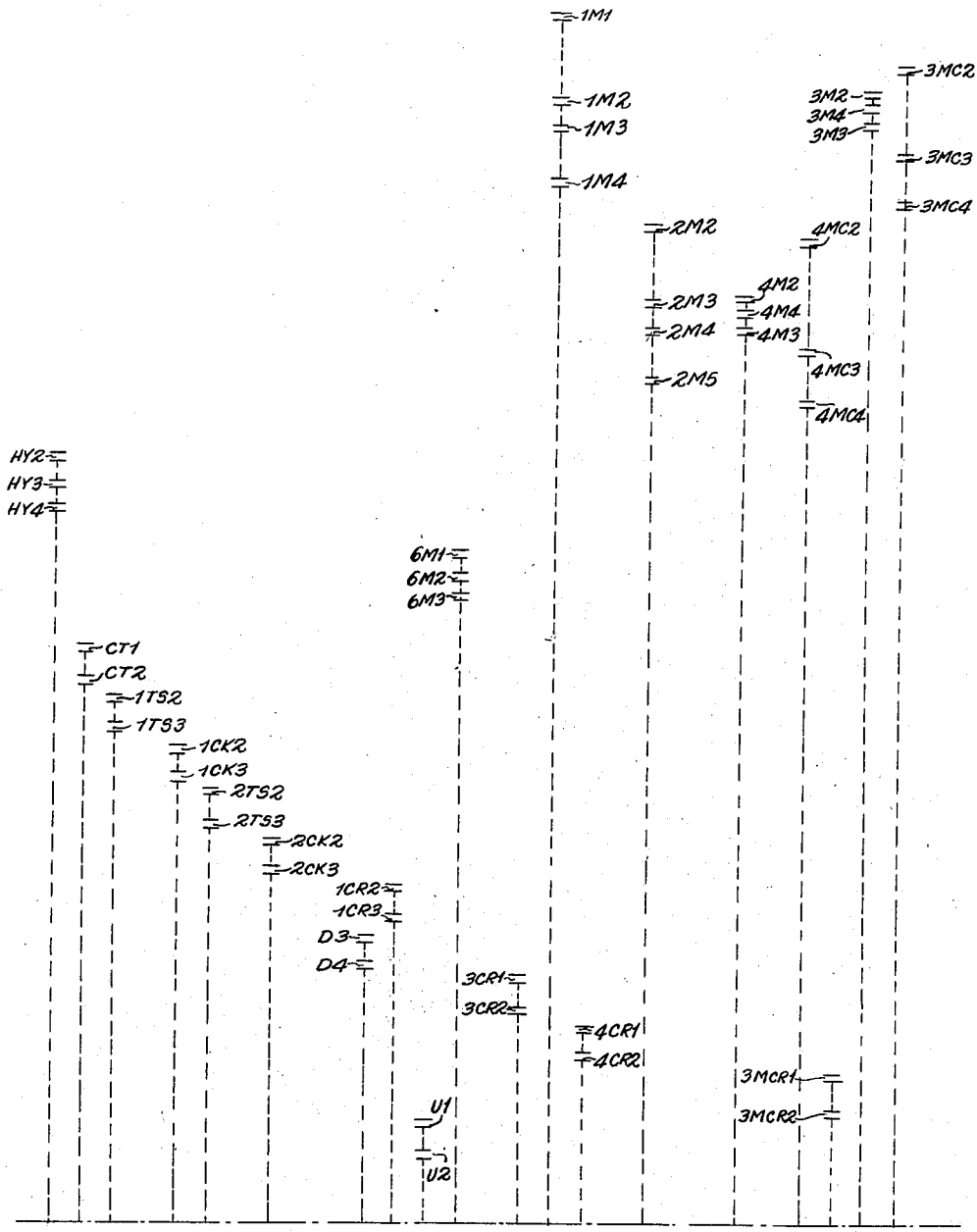
Figure 13B:
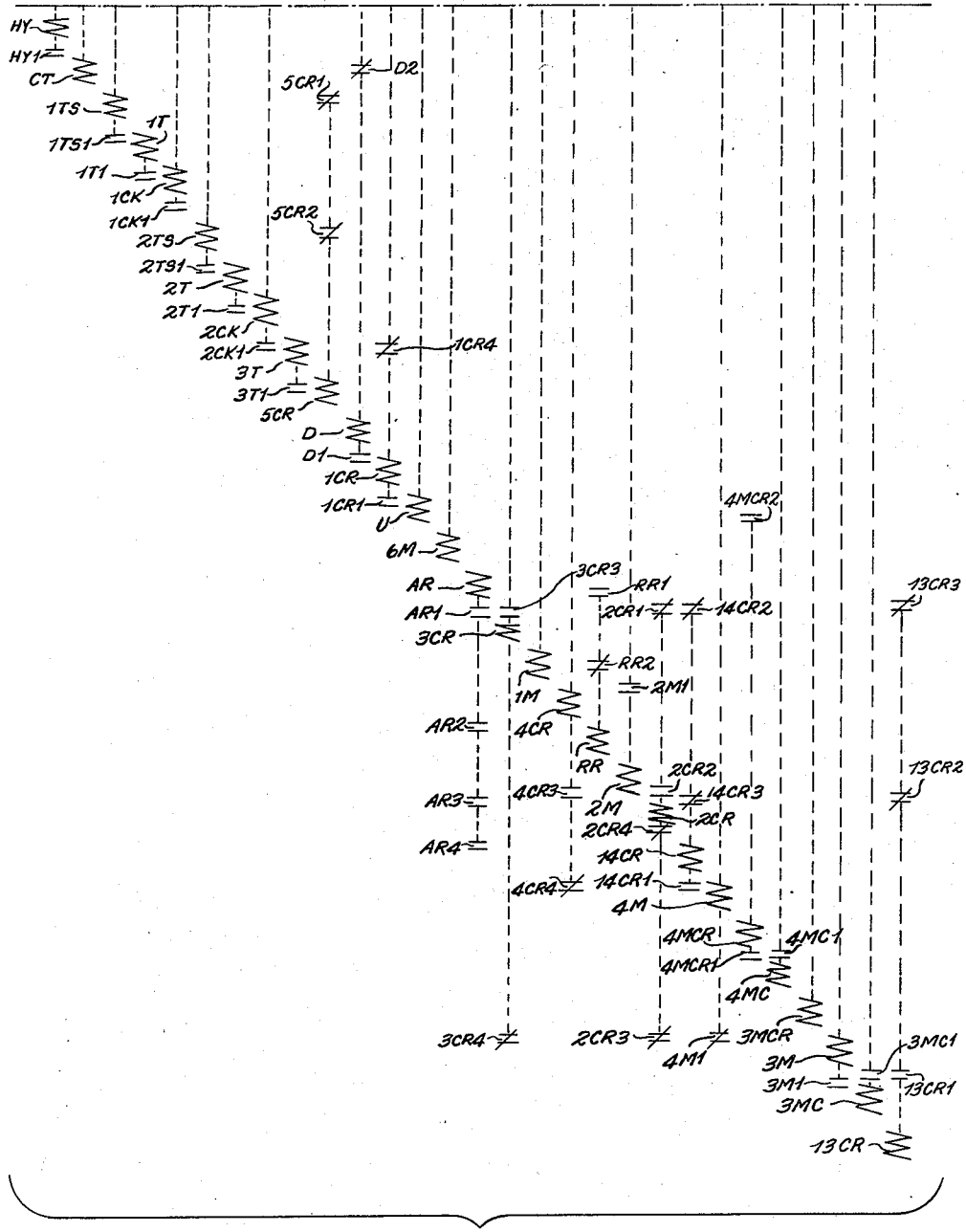

Figs. 12A and 12B, taken together in vertical alignment, comprise a simplified, schematic wiring diagram of the controls for the machine;

Figs. 13A and 13B, taken together in vertical alignment, comprise a key to the wiring diagram shown in Figs. 12A and 12B, the key being so arranged that when Figs. 12A and 12B are placed side by side with Figs. 13A and 13B, respectively, the relay coils and contacts in the key are horizontally aligned with the corresponding coils and contacts in the circuit diagram, and the contacts actuated by each of the relay coils are vertically arranged, in the key, above and/or below the proper operating coil; and, Figs. 14A, 14B and 14C, taken together, are a wiring diagram of the electrical circuit for the machine, this circuit being the same as that illustrated in Figs. 12A and 12B but being laid out in accordance with Patent Office standards and requirements.

While the invention is susceptible of embodiment in various forms in alternative constructions, it is herein shown and described as incorporated in a vertical turning machine wherein two workpieces are simultaneously operated upon, the work being rotated about parallel, vertically extending axes and in cutting relationship with disk-like tools rotated about axes at right angles to the axes of rotation of the work. These tools are preferably of the type which have portions of different radii adapted to turn different diameters on the workpieces as a relative feeding movement is effected between the latter and the cutters in a direction longitudinally of the axes of rotation of the work. The machine includes mechanism for automatically varying the speed of rotation of the workpieces and/or the speed of feeding movement during different portions of the feeding movement so that the cutting operations are always performed at cutting speeds consistent with the requirements of the tools and work. The machine also includes controls enabling the machine to operate under operator control rather than automatically and/or for effecting an entire machining operation at but one rotational speed of the workpieces.

Figure 1:
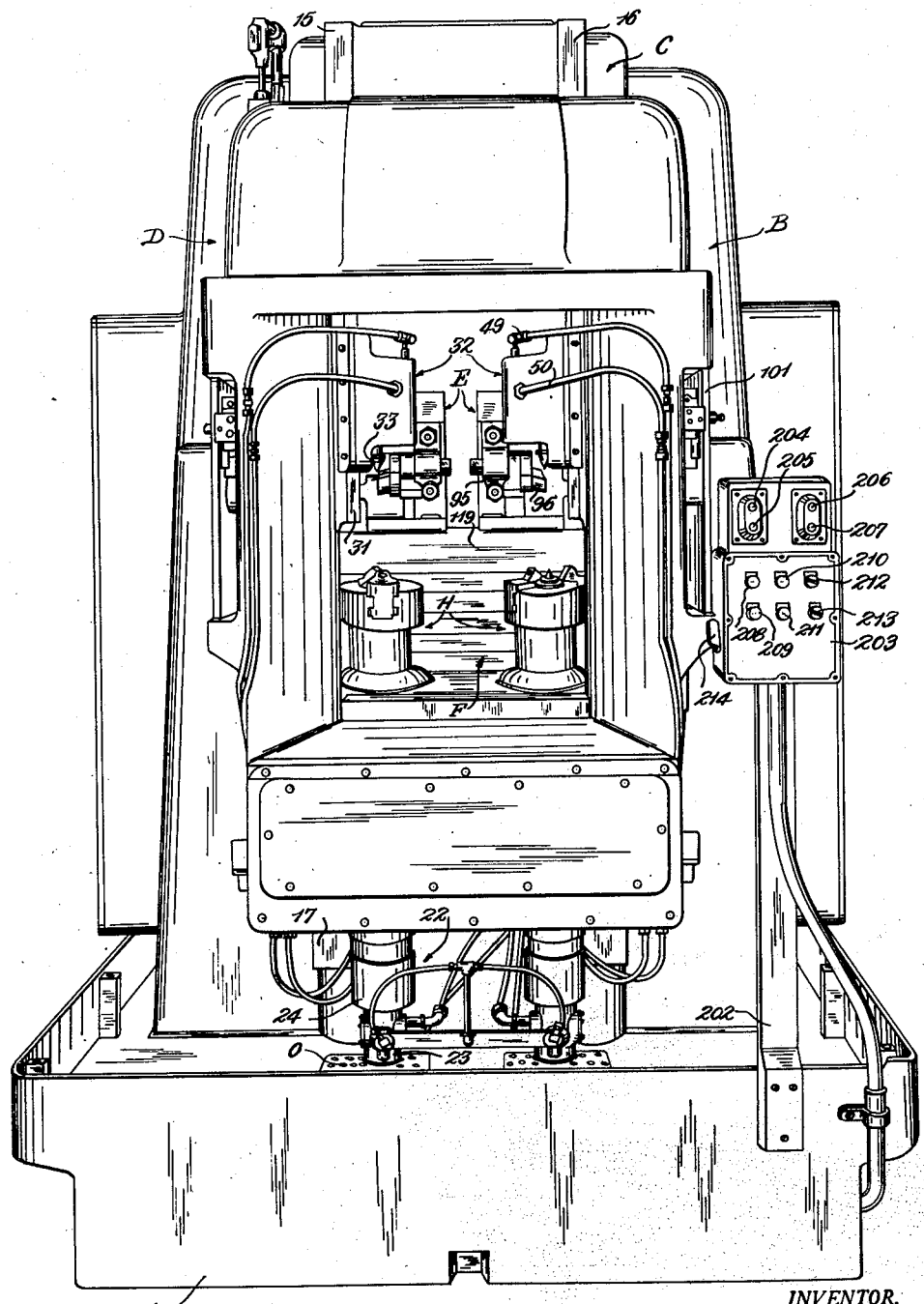
Fig. 1 is a front perspective view of a machine constructed in accordance with this invention and illustrating the opening in the frame which provides access for placing, observing, and removing the work.
Figure 2:
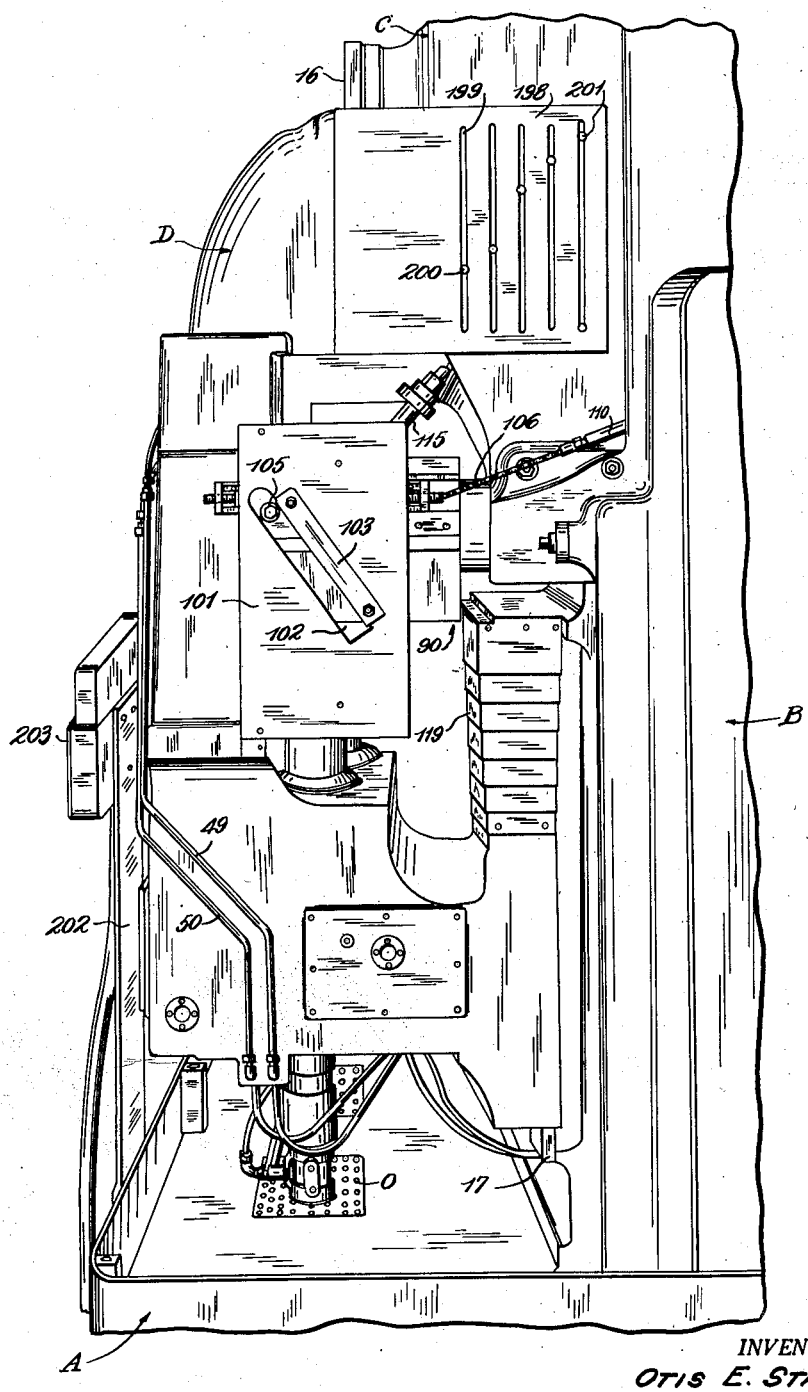
Fig. 2 is a fragmentary, side perspective view of the machine as seen from the right-hand side of Fig. 1.
Figure 3:
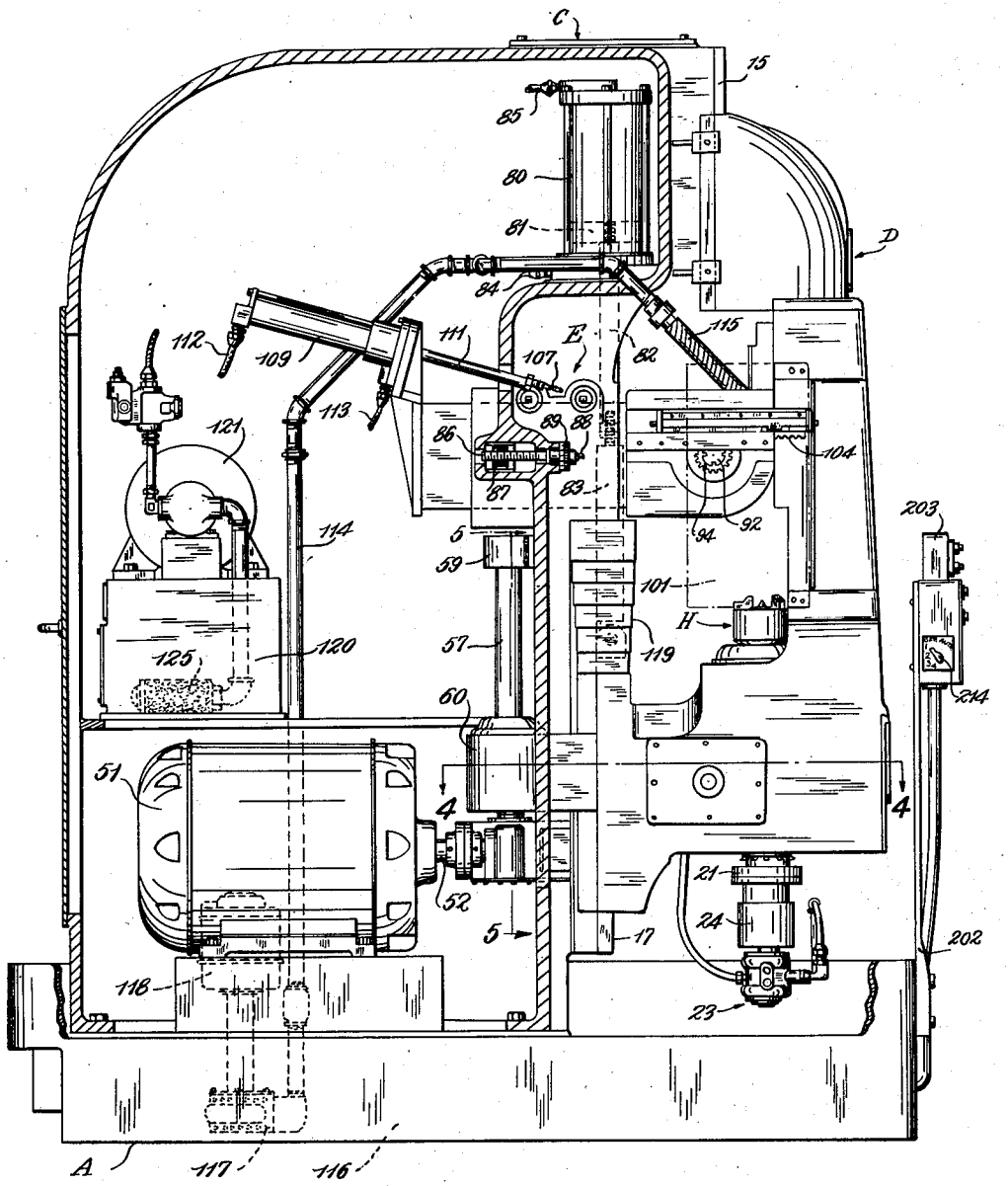
Fig. 3 is a side view, partially in section and partially in elevation, the view being taken from the left of Fig. 1 with the side wall of the stationary portion of the frame broken away and with certain parts omitted to more clearly illustrate the construction.

Referring first to Figs. 1, 2 and 3 of the drawings, it will be seen that the illustrated machine is of the vertical type and comprises a frame formed by a base A which supports a vertical hollow column B, the latter, in turn, including a forwardly projecting portion C. Provided upon the forwardly projecting portion C of the column are spaced parallel extending guideways 15 and 16 which, together with parallel, spaced guideways 17 adjacent the base of the column, jointly support a workhead D for vertical movement. The vertical column B is provided with two horizontally spaced tool heads E on that face of the column which is adjacent the workhead. The tool heads are adjustably supported, for movement towards and away from the workhead, in suitable apertures in the column and are retained in any adjusted position by conventional locking means.

The workhead D is provided with two means for supporting and rotating workpieces or work blanks, which supporting means are so disposed that the workpieces mounted thereon are engaged and machined by tools carried by the tool head E when the workhead D is vertically moved relative thereto. Heretofore, in employing machines of the general type herein illustrated and described, the provision of more than a single workpiece support required either a turret type machine or else the operator had to move from point to point about the machine to load and unload work and to observe the machining operations thereon. In accordance with this invention, however, the workhead E is provided with a central opening therethrough, designated F, see Fig. 1, which is so disposed as to afford access to either of the work supporting means from a single station adjacent the front of the machine. Hence, the operator may place and remove the work and observe the operation of both portions of a dual spindle machine without leaving the operating station adjacent the controls.

The means for supporting and rotating each of the two workpieces operated upon by the machine are identical, as are the tool supports and actuating means for the latter and hence only one each of these several devices will be described in detail. As will be apparent from Figs. 1 and 4, the workhead D is symmetrical about a vertical center line with each of the work holding and rotating means located equal distances from either side of that center line and adjacent the sides of the opening F. These work holding and supporting means each comprise a chuck, generally designated H, supported on the upper end of a hollow spindle 18, see Fig. 10, which is rotatably supported with its axes extending vertically in the lower portion of the workhead D by means of antifriction bearings 19 and 20. Connected by a suitable coupling 21 to the lower end of each spindle is an hydraulic actuator 22 adapted to have fluid under pressure admitted thereto and exhausted therefrom under control of a solenoid actuated valve 23. The fluid pressure actuator 22 comprises a cylinder 24 in which is disposed a piston 25. The piston 25 is provided with a piston rod 26 which has a threaded connection with a connecting link 26a comprising one or more rods extending upwardly through the hollow bore of the spindle 18, the upper end of the link 26a being connected with a chuck actuating member 27. The threaded connection of the piston rod 26 with the rod or rods, comprising the link 26a, provides for adjustment of the over-all length of the rods when assembling.

The chuck H herein illustrated is of the universal type with radially movable jaw members 28 which are actuated by bell crank levers 29 pivoted upon the housing for the chuck and each having one arm cooperating with the jaw members 28, the other arms of the levers being received in a suitable annular groove in the actuating member 27. The construction is such that when fluid under pressure is applied in one direction to the cylinder 24, the piston therein moves the piston rod 26 and link 26a upwardly thereby moving the jaw members radially outwardly and effecting gripping upon a central opening of a hollow body. A release of the jaws from the workpiece is effected by applying fluid pressure to the cylinder 24 in the opposite direction thereby moving the parts in a reverse direction. When the work-piece is of the type which is to be gripped externally, fluid pressure is applied in the direction which moves the piston rod 26 and link 26a downwardly, whereupon the jaw members 28 move inwardly to grip the work therebetween. In the form of the chuck shown in Fig. 10, a center point 30 is shown centrally of the chuck for cooperation with a drilled opening or recess in the workpiece to center the latter in the chuck. This may be utilized or omitted as desired and forms no part of the invention.

The upper portions of the sides of the opening F through the workhead are provided with spaced, vertically extending, ways 31 which are adapted to adjustably support tailstock mechanisms, generally designated 32, the tailstock mechanisms being retained in any adjusted position by suitable locking means cooperating with the ways. Each of the tailstock mechanisms comprises a center point 33 which is adapted to be longitudinally moved by a fluid pressure operated mechanism in which the center point is rotatably supported.

Figures 8, 9, 10:
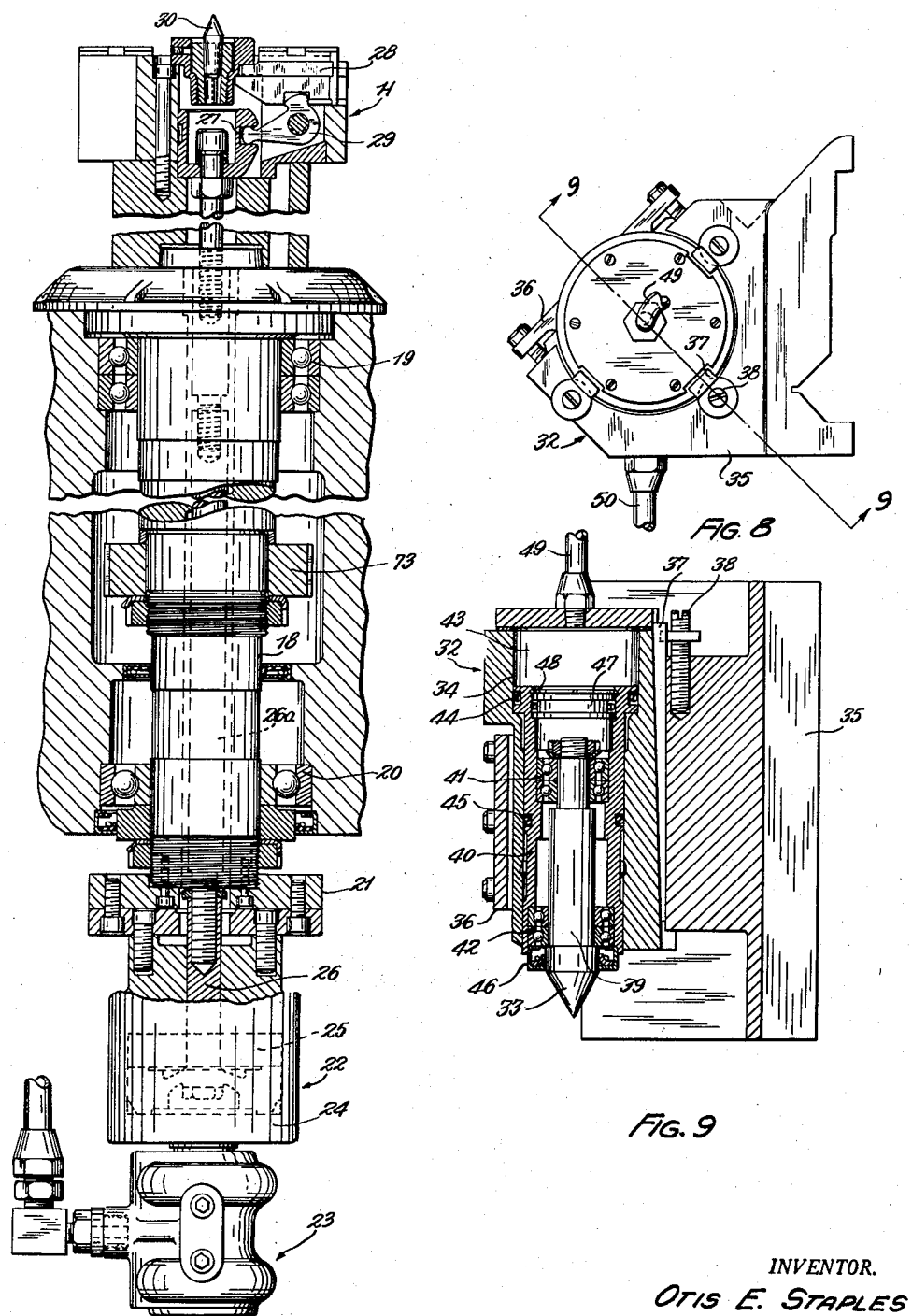
Fig. 8 is a plan view of one of the tailstock mechanisms.
Fig. 9 is a longitudinal sectional view taken substantially on the line 9—9 of Fig. 8.
Fig. 10 is an enlarged view, partly in section and partly in elevation, of one of the work spindles, the chuck, and the chuck actuating mechanism, the section through the parts thus illustrated being taken substantially on the longitudinal center line of the spindle.

As will be seen most clearly in Fig. 9, the fluid actuating means for each tailstock mechanism comprises a cylinder 34 which is secured in a recess of the mounting bracket 35 by a clamping plate 36 secured to the bracket, adjustment of the axis of the tail center 33 being effected by means of tapered gibs 37 positioned between the cylinder 34 and the bracket 35 and actuated by adjusting screws 38. The tail center 33 has an elongated shank 39 which is rotatably mounted within a hollow bore of a piston 40 by bearings 41 and 42. The upper end of the piston 40 is enlarged and is slidable within a counterbored portion 43 of the cylinder 34, which counterbored portion constitutes the main chamber of the cylinder. This enlarged portion of the piston is provided with packing means or piston ring 44 disposed within an annular groove, which packing means may, for example, be an O ring or the like. Intermediate its ends, the piston 40 may be provided with a second packing means, such as an O-ring 45, to prevent leakage of fluid from the cylinder, and a packing 46, such as a conventional oil seal or the like, may be provided adjacent the lower bearings 42 and cooperating with the tail center 33 to prevent leakage through the bearings. The upper end of the opening through the piston 40 is closed by a sealing member 47 which is preferably circular and provided with a circular groove in the periphery thereof in which is disposed a suitable packing 48, the sealing member being held in place by a snap ring or the like.

The cylinder 34 is provided with suitable fluid pressure inlet and exhaust openings 49 and 50, see Figs. 8, 9 and 11. The control of the application of fluid under pressure to the cylinder and the exhaust therefrom is effected in a manner hereinafter described. For the present it is sufficient to note that, when fluid pressure is applied above the piston 40, the latter is moved downwardly to engage the tail center 33 with a recess or opening in the upper end of a workpiece which has been inserted in the chuck H on the spindle 18 located therebelow, the tail center cooperating with the chuck to center and support the work. Conversely, when fluid pressure is applied below the enlarged portion of the piston 40, the latter is moved upwardly away from the upper end of the workpiece so that the latter may be removed.

Rotation of the work spindles 18 at any of a plurality of different speeds is effected by a multi-speed electric motor 51 located within the hollow frame of the machine, see Fig. 3. This motor is preferably of the three-phase, alternating current, multi-speed type such that its windings may be selectively engaged to provide a given number of different predetermined speeds, the illustrated motor being so constructed and connected into the control circuit, as hereinafter described, as to provide four different speeds. It will be understood, however, that motors of other types and having different numbers of predetermined speeds may be provided depending upon the requirements for a particular machine.

The armature shaft 52 of the motor 51 is coupled to a shaft 53 suitably journalled in a housing 54 which is mounted upon the lower portion of the column B adjacent the ways 17. The shaft 53 has a helical pinion 55 keyed thereto which meshes with a helical gear 56 keyed to a lower end of a vertically extending shaft 57. The shaft 57 is rotatably supported adjacent its lower end in the housing 54 while its upper end is rotatably supported by suitable bearings 58 in a bearing mounting bracket 59 attached to the inner face of the forward portion of the vertical column B. Intermediate its ends, the shaft 57 is splined for a considerable portion of its length and this splined portion extends through a gear housing 60 which may, as shown, be integral with the inner lower end of the workhead D or may be a separate housing attached to the workhead, the column B having a suitable vertically elongated opening through which the gear housing projects. Within the gear housing 60, the shaft 57 is provided with a helical gear 61 suitably keyed or otherwise connected with the splines on the shaft 57 so as to be rotated thereby and slidable therealong. The gear 61 meshes with a helical gear 62 keyed to or otherwise connected upon the outer end of a forwardly extending shaft 63.

The shaft 63 extends horizontally through the lower portion of the workhead D, substantially centrally thereof, and is provided at its outer end with a gear 64 which drives a gear 65 through a change gear or train of change gears, generally designated 66. The gear or gears 66 are mounted upon studs such as 67 which are adjustably mounted in slots provided in a mounting plate or plates such as 68, the construction being such that by altering the position of the stud or studs 67 in the slots of the plate 68, differing numbers and/or sizes of gears in the gear train 66 may be employed to provide a given speed and/or direction of rotation of the gear 65 with respect to the gear 64. The gear 65 is connected for rotation with the outer end of a shaft 69 journalled, by suitable anti-friction bearings 70 and 71, in a horizontal bore in the workhead, the inner end of the shaft 69 being provided with a gear 72 which meshes with a gear 73 secured to the work spindle 18 intermediate the ends of the latter. The gear 64 also drives a gear 74 through a change gear or train of gears 75 which are similar to the gear or gears 66. The gear 74 is connected on the outer end of a shaft 76 journalled in a horizontal bore in the workhead, and this shaft has its inner end connected with a gear 77 which meshes with a gear 78 upon the other work spindle 79 of the machine. As mentioned heretofore, the work spindle 79 is identical with the work spindle 18 and hence will not be described in detail.

It will be noted that the rotation of the two spindles 18 and 79 is in the same direction in the present embodiment of the device, since it is contemplated that the machine will be employed to effect a roughing cut on a workpiece positioned upon one of the spindles, such as on the left-hand spindle as viewed in Fig. 1, and a finishing cut effected at the same time upon a previously rough-cut workpiece positioned upon the right-hand spindle of the machine. Consequently, the same types of operations are simultaneously effected upon both workpieces so that the directions of rotation of the spindles should be the same. Therefore, when substituting for gears in the trains 66 and 75, the number and sizes of gears employed in the respective trains must be the same so that the directions of rotation are not reversed with respect to each other and so that the speeds of the two spindles remain the same.

Vertical movement of the workhead D relative to the column B and base A is effected by a fluid pressure actuated mechanism which preferably comprises a cylinder 80 supported in the forwardly projecting portion C of the frame and containing a piston 81 which is connected with the piston rod 82, see Figs. 3 and 11. The piston rod 82 extends downwardly below the portion C of the frame and is connected by means of a suitable link or pull rod 83, to the lower portion of the workhead D. The cylinder 80 is provided with fluid pressure connections 84, 85 adjacent either end through which fluid under pressure may be admitted to and exhausted from the cylinder 80 on either side of the piston 81, to thereby cause the piston to move within the cylinder and effect a corresponding movement of the workhead. As will be hereinafter described, the novel machine of this invention includes means for providing fluid under pressure at different predetermined rates to the cylinder 80 for effecting a rapid traverse movement of the workhead and feeding movement at a plurality of different rates. Consequently, the workhead may be rapidly moved to bring the workpieces into cooperative engagement with the tools whereupon the speed of movement of the workhead is automatically reduced to a predetermined value while a first machining operation is effected, the speed of movement of the workhead being successively changed as each different portion is machined upon the workpiece and the workhead being rapidly returned to its starting position at the end of the machining operation. Moreover, the apparatus is capable of being manually operated at any selected one of the predetermined speeds thereof, as will be hereinafter apparent. While only a single fluid pressure actuated lift cylinder 80 has been shown, it will be apparent that a plurality of such cylinders may be employed, if necessary or desired; the operations will, however, be the same since the cylinders would then simply be connected to the workhead in parallel and would act together.

As mentioned heretofore, the portion B of the frame is provided with a plurality of tool supporting heads E. These tool supporting heads are preferably constructed in substantially the same manner and provided with tools similar to those shown in the aforementioned Staples Patent 2,362,318. Consequently, it is deemed unnecessary to describe these tool heads and tools in detail. Suffice it to note that each tool head is substantially cylindrical and is mounted in a cylindrical boss in the column B of the machine, being keyed therein to prevent rotation relative thereto. Each tool head is adjustable longitudinally of its axis by means of an adjusting screw 86 journalled in suitable bosses on the column B and cooperating with a nut portion 87 carried by the tool head. The outer end of the adjusting screw 86 is provided with a suitable polygonal portion 88 for reception of a wrench or other tool to effect rotation thereof and consequently adjustment of the tool head, the screw preferably being provided with a micrometer type dial 89 to indicate the extent of adjustment of the tool head.

Figure 6:
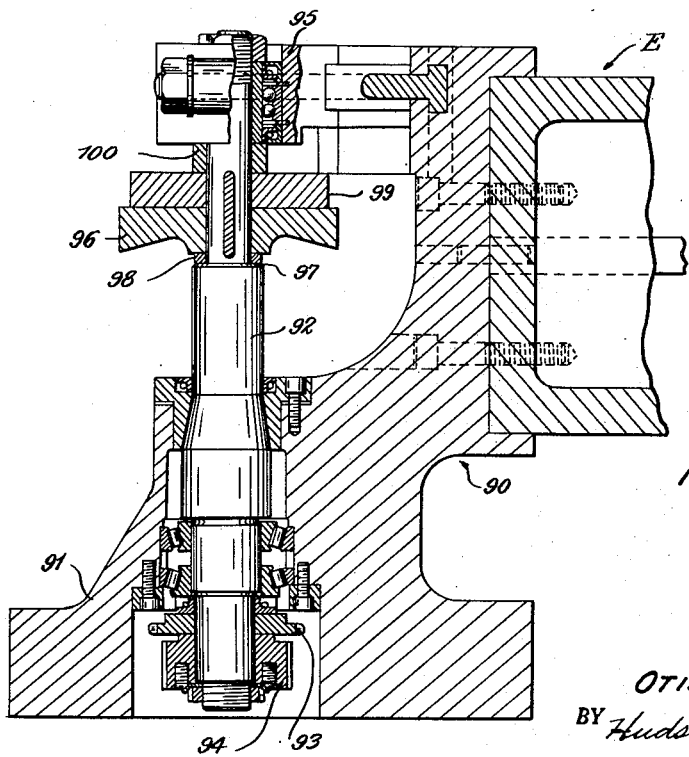
Fig. 6 is an enlarged, sectional view of one tool supporting means or spindle and illustrating a turning tool mounted thereon.

The forward portion of each tool head E is provided with a tool supporting bracket 90, see Fig. 6, which is mounted on the end of the cylindrical portion of the tool head, preferably in a manner permitting angular adjustment of the bracket relative to the cylindrical portion, as by the use of T-headed bolts in annular grooves or by similar expedients well known in the art. The bracket 90 of each tool head is provided with an integral, outwardly extending portion 91 provided with a transversely extending bore in which is journalled one end of a tool support or spindle 92, suitable bearings, oil seals and the like being provided between the spindle 92 and the portion 91 of the bracket. The bore through the portion 91 of the bracket is enlarged at the outer end thereof and disposed within this enlarged bore, and connected with the spindle 92, are a sprocket wheel 93 and a rack pinion 94. The other end of each spindle 92 is journalled by means of suitable bearings in an outboard bearing support 95 provided upon the bracket 90. Intermediate the portion 91 and the outboard bearing support 95, each spindle or tool support 92 is provided with a substantially disk-shaped cutter or tool 96 which is keyed to the spindle, the tool being prevented from axial displacement by an integral shoulder 97, on the support or spindle 92, and by the outboard bearing support 95, suitable spacers such as 98, 99 and 100 being employed if necessary. The tool or cutter 96 will have a configuration depending upon the type of machining operation to be performed on a workpiece. By way of example, but without limitation thereto, the cutter may have a shape similar to that shown in the previously mentioned Staples Patent 2,341,668.

Figure 7:
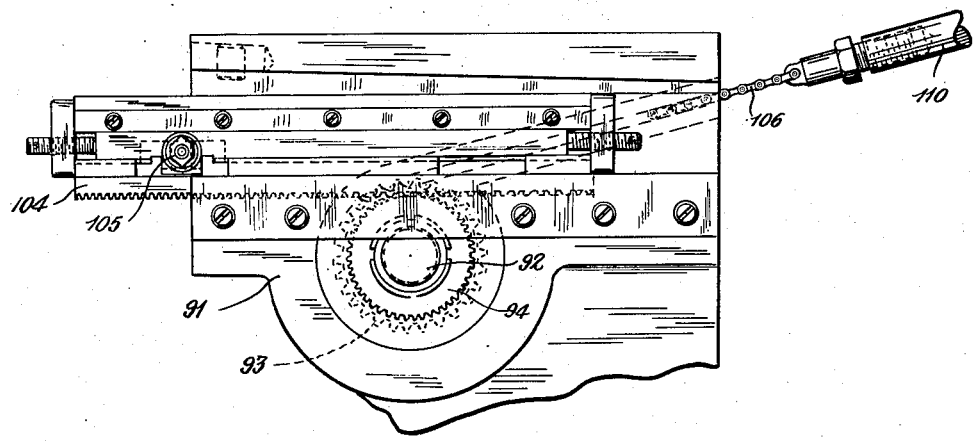
Fig. 7 is an enlarged, fragmentary, side elevational view of a tool or cutter tensioning and actuating mechanism.

As mentioned heretofore, each of the tool heads E is constructed alike and hence each is provided with a tool support or spindle 92 having a tool, such as 96, mounted thereon for effecting a machining operation upon a workpiece as the latter is moved therepast due to operation of the lift cylinder 80. During this movement each of the tools 96 is rotated in timed relationship with the vertical movement of the workhead to bring the proper surface of each tool into cutting relationship with the corresponding workpiece so that the several machining operations are sequentially effected thereon. For this purpose, cam plates such as 101 are provided on each side of the workhead D and connected therewith. Each of these cam plates has a suitably designed slot 102 therethrough and adjacent one longitudinal edge of the slot is provided a wear plate 103. Slidably mounted adjacent the outer side face of each of the portions 91 of the tool head brackets 90 are rack bars 104, see Fig. 7, the teeth of which mesh with the teeth of the rack pinion 94 upon the corresponding tool spindle 92. These rack bars are each adjustably connected with a cam roller 105, in a manner more fully illustrated and described in the previously mentioned Staples Patent 2,362,318 and each cam roller projects into the aforementioned slot 102 of the plate 101 carried by the adjacent side of the workhead, the cams riding in contact with the edges of the wear plates 103. Consequently, when the workhead is moved vertically, the racks 104 are given a horizontal movement which results in rotation of the tool spindles and tools in predetermined timed relationship with the movement of the workhead.

In order to positively maintain this movement of each tool in exact predetermined relationship with respect to the vertical movement of the workhead, each tool spindle 92 is constantly urged in a direction which forces the corresponding cam roller 105 into engagement with the associated cam wear plate 103. In the present form of the machine, this is effected by training a separate sprocket chain 106, 107 about each sprocket wheel 93 on the respective tool spindles and tensioning the chains by separate fluid pressure operated mechanisms comprising cylinders 108 and 109, provided with pistons and having the piston rods 110 and 111 thereof, connected with the chains 106 and 107, respectively. These tension cylinders, see Fig. 11, are each provided with fluid inlet and outlet connections 112 and 113 through which fluid under pressure may be supplied to and exhausted from the cylinders for effecting operation of the piston rods.

As hereinafter described, the application of fluid under pressure to the cylinders 108 and 109 is in the direction which tensions the chains 106 and 107 when machining is being effected, the application of the fluid pressure being in the reverse direction, thereby removing the tension from the chains, when the workhead is being returned to its initial position. It will be understood that the shape of the cam slots, such as 102 and hence of the wear plates 103, will depend upon the type of surfaces to be produced upon the workpieces, since this will, in turn, determine the speed with which the cutters must be rotated to bring the several surfaces thereon into cooperation with the workpieces. As is well known in machine tools of the type herein illustrated and described, the tool, in effect, rolls upon the workpiece as the latter is fed and the tool is progressively rotated and this speed of rolling for any given portion of the tool depends upon the nature of the surface cut, the shape of the cam slot being such as to provide the desired rates of rotation of the tool. For simplicity, however, the cam control slot 102 has herein been shown as substantially diagonal.

During the machining operations a coolant or cutting fluid is preferably supplied to the tools and workpieces through a suitable conduit, such as 114, which has two branches, one for each tool head. Each branch of the conduit 114 is provided at its outer end with a nozzle portion 115 for directing the fluid over the adjacent tool and workpiece. The conduit 114 extends into a reservoir or sump 116 in the base A of the machine, the coolant or cutting fluid being withdrawn therefrom through a filter 117 and forced through the conduit 114 by means of a coolant pump 118. The upper surface of the base A below the workhead D is preferably provided with suitable openings O which may be covered with wire mesh, gratings, or the like to allow return of the coolant or cutting fluid to the sump while retaining the chips from the machining operation upon the upper surface of the base. In order to prevent injury to the lower ways 17 for the workhead and to prevent the entrance of dirt or chips between the workhead and the ways, the pull rod 83 and the ways 17 may be shielded by suitable telescoping guards, such as 119 attached at the opposite ends thereof to portions of the workhead and of the stationary frame, respectively.

As mentioned heretofore, operation of the chucks and tail stocks for the machine, as well as vertical movement of the workhead and tensioning of the tool spindles, are all effected by fluid pressure operated actuators. In the embodiment illustrated the fluid employed is preferably a liquid, such as oil or the like, the application of which to the several actuators is controlled by electrically operated valves in a manner hereinafter described. The hydraulic system of the machine will be readily apparent from consideration of Fig. 3 in conjunction with the somewhat schematic showing of the entire system in Fig. 11. Liquid for operating the several actuators is contained within a tank or reservoir 120, preferably disposed within the hollow column B of the machine, the liquid being withdrawn therefrom and delivered to the various actuators by a suitable pump or pumps operated by a single electric motor 121, the pressure of the liquid being regulated by one or more settable pressure relief valves. Thus, as shown in Fig. 11, the motor 121 is connected to drive two different capacity pumps 122 and 123, the former being provided for supplying the fluid pressure for operation of the several tailstock and chuck mechanisms as well as the cutter tensioning cylinders, and the latter pump supplying the fluid pressure for operation of the lift cylinder which effects the vertical movement of the workhead.

The inlet connection 124 for the pump 122 is provided interiorly of the reservoir 120, with a strainer 125. The outlet connection 126 of this pump is provided with a pressure relief valve 127 which may be set to a predetermined pressure so that pressures in excess thereof are relieved to the reservoir through the conduit 128. The pressure relief valve 127 is also connected with a main pressure supply conduit 129 to which solenoid operated valves 130, 131, 132, 133 and 134 are, in turn, connected in parallel. These valves are of conventional construction and the solenoid operators therefore are connected in a suitable electrical control circuit illustrated in Figs. 12A, 12B and 14A, 14B and 14C hereinafter described in detail.

For the present, it is sufficient to note that each of the valves, as, for example, valve 130, is adapted to selectively supply fluid under pressure through either of two conduits connected with the pressure inlet and exhaust openings for the corresponding cylinder, the other of said conduits being connected through the valve to a drain conduit which is, in turn, connected with a common drain conduit 135 returning the liquid to the reservoir 120. Thus, the valve 130 has a solenoid actuator CTS for selectively communicating its fluid pressure supply conduit 136 with either of the conduits 137 and 138 which are connected respectively with the connections 112 and 113 for the cutter tension cylinders 108 and 109, the other of the conduits 137, 138 being simultaneously placed in communication with the drain conduit 139 of the valve. Likewise, one of the tailstock cylinders 34 has its valve 131 operated by a solenoid actuator 1TSS to selectively communicate its fluid pressure inlet conduit 140 with either of the two conduits 141 and 142 for supplying fluid under pressure to the inlet and exhaust connections of the cylinder, the other of these conduits 141, 142 being simultaneously placed in communication with the drain conduit 143 of the valve. The chuck which cooperates with this tailstock to hold and center a workpiece has its valve 132 operated by a solenoid actuator 1CKS to control application of fluid under pressure from the conduit 144 to either one of the conduits 145, 146 connected to one of the actuating cylinders 22, the other of these conduits being then in communication with the drain conduit 147. The valve 133 for operating the second tailstock is provided with a solenoid actuator 2TSS for selectively communicating its pressure conduit 148 to either of the conduits 149, 150 which are connected to the tailstock actuating cylinder, the other of the conduits 149, 150 being simultaneously in communication through the valve with the drain conduit 151. The second chuck has its operating valve 134 operated by a solenoid actuator 2CKS which selectively intercommunicates the pressure conduit 152 of the valve with either of the conduits 153 or 154 which are connected with the chuck actuating cylinder, the other of these conduits then being in communication with the drain conduit 155 of the valve.

Preferably each of these valves 131–134 is of conventional construction and of the type such that it is operated to, and held in, one position by energization of its solenoid actuator. The valves are each returned to its initial, or other position, upon deenergization of its solenoid, by means of a spring or other suitable expedient.

The inlet of the pump 123 is provided with a conduit 156 extending into the tank or reservoir 120 and is provided on its inner end with a strainer 157. The outlet of the pump 123 is connected to a pressure relief valve 158 which is adapted to be set to a predetermined pressure so that pressures in excess of that value are relieved to the tank or reservoir 120 through a conduit 159. Normally, however, the outlet side of the relief valve 158 is connected by a conduit 160 to a double-acting valve 161, which is adapted to be actuated in one direction by a solenoid actuator 161A and in the other direction by a solenoid actuator 161B. The valve 161 is adapted to place the conduit 160 in communication with either of two conduits 162, 163 and to simultaneously communicate the other of these conduits with an exhaust conduit 164 providing return for the fluid to the reservoir 120. The conduit 162 is connected with the conduit or fluid connection 85 at the upper end of the lift cylinder 80, while the conduit 163 has a plurality of solenoid operated valves connected thereto, in parallel, for controlling the application of fluid under pressure at different rates to the connection 84 of the cylinder 80 thereby controlling the rate of movement of the workhead.

A conduit 165 has one end connected to the conduit 163 and the other end connected with a valve 166 which is operated by a solenoid actuator 1FS. The valve 166 is adapted to place the conduit 165 in communication with the conduit 167 which is connected to an adjustable metering valve 168 for regulating the rate of flow of the fluid under pressure. The outlet of valve 168 is connected by a conduit 169 to a check valve 170 and the latter is connected with the aforementioned conduit or connection 84 of cylinder 80 by a conduit 171. The valve 168 is adjusted to provide a predetermined rate of flow of liquid under pressure therethrough so that the rate of application of fluid pressure to the cylinder 80 may be selected and maintained at a predetermined value to thereby provide a first feeding rate of movement to the workhead. The valve 166 is also provided with a conduit 172 which is connected with a drain conduit 173 leading to the previously mentioned drain conduit 164. The construction is such that, when the solenoid actuator 1FS is energized, the valve 166 is operated to supply fluid pressure from the conduit 165 through the valve 166, conduit 167, metering valve 168, conduit 169, check valve 170, and the conduit 171 to the cylinder 80 below the piston 81 therein. When the solenoid 1FS is deenergized the valve 166 terminates the communication between the conduits 165, 167 and connects the latter to the drain 172. If desired, a suitable drain may be provided for metering valve 168. The check valve 170 is of the conventional type adapted to permit flow therethrough in only one direction and to block flow in the opposite direction, the valve being connected to permit flow from the conduit 169 to conduit 171 but not in the reverse direction.

Also connected with the conduit 163 is a conduit 175 leading to a valve 176 operated by a solenoid actuator 2FS. This valve is similar in construction and operation to that designated 166 and is therefore provided with conduits 177, 178 for supplying fluid under pressure to a metering valve 179 or for draining the valve to the drain conduit 173, respectively. The metering valve 179 is similar to the valve 168 and is adjusted to regulate the rate of flow of fluid under pressure therethrough. The valve 179 is connected by a conduit 180 to the check valve 181 and the latter is connected by the conduit 171 to the cylinder 80 so that fluid pressure may be supplied to the latter at a rate such as to provide a second rate of feeding movement of the workhead.

Likewise, a conduit 182 interconnects the conduit 163 with a valve 183 which is operated by a solenoid actuator 3FS to selectively supply fluid under pressure to a conduit 184 or to drain the valve through a conduit 185, the latter being connected with the drain conduit 173. The conduit 184 is connected with a metering valve 186 which is adjusted to provide fluid under pressure at a rate to effect a third rate of feeding movement of the workhead, the fluid under pressure flowing from the valve 186 through a conduit 187 and a check valve 188 to the conduit 171 and thence to the lift cylinder 80.

A conduit 189 interconnects the conduit 163 to yet another solenoid operated valve 190 which is actuated by a solenoid 4FS to supply fluid under pressure from the conduit 189 through a conduit 191 to a metering valve 192, and from the latter through a conduit 193 and a check valve 194 to the conduit 171 connected to the cylinder 80. The metering valve 192 is adjusted to effect a fourth rate of flow of fluid under pressure for effecting feeding movement of the workhead at a fourth rate of speed. Since this rate of movement is relatively fast, these last-mentioned valves and connections are also employed, as hereinafter described, for effecting the rapid traverse movement of the workhead. The valve 190 is, like the valve 166, connected to the drain conduit 173 by a suitable conduit such as 195. Intermediate the conduit 165 and the valve 161, the conduit 163 is connected to a conduit 196 which is connected through a check valve 197 to the conduit 171 and hence to the lower fluid pressure connection 84 for the cylinder 80. It will be observed, however, that the check valve 197 allows flow of fluid therethrough only in the reverse direction to that permitted through the previously mentioned check valves 170, 181, 188 and 194.

As mentioned heretofore, the valve 161 is of the double-acting type and is adapted to be operated in reverse directions by its actuators 161A and 161B. Preferably the valve 161 returns to its neutral position when neither of the actuators 161A and 161B are energized. When the operator or actuator 161A is energized, the valve 161 is positioned to connect the conduit 160 with the conduit 163 and hence energization of one of the valve actuators, such as 1FS, 2FS, 3FS or 4FS, will supply fluid under pressure at the predetermined rate dependent upon the setting of the corresponding metering valve, such as 168, etc., to the lower fluid connection 84 for the lift cylinder 80. The upper fluid connection 85 of the lift cylinder will be simultaneously connected, through the conduit 162 and the valve 161, to the exhaust conduit 164. Hence, the piston 81 is moved upwardly at a rate depending upon the rate of the supply of fluid pressure through the metering valve corresponding with the particular valve such as 166 that has been operated. When the lift cylinder has elevated the workhead a predetermined distance, the application of fluid under pressure at that given rate is terminated, as hereinafter described, and another of the valves, 166 to 190, is then operated to supply fluid under pressure through the associated metering valve to the lift cylinder at a different rate. Thus a rapid traverse movement and four rates of feeding movement may be imparted to the workhead by selective operation of valves 166 to 190, the valve actuator 161A remaining energized throughout these movements of the workhead. When the workhead has been elevated to its desired maximum position through operation of the various valves, such as 166, 176, 183 and 190, the solenoid 161A is deenergized and the solenoid 161B is energized. This moves the valve 161 so that the fluid under pressure from the conduit 160 is now supplied to the conduit 162 and hence to the upper end of the cylinder 80, while the lower end of the cylinder is connected through the conduit 171 and the check valve 197 to the conduit 196 which is now connected through valve 161 with the exhaust conduit 164. Hence the workhead may be rapidly returned to its lowermost position. If desired, a metering valve, or the like, may be supplied in the conduit 196 to regulate the rate of this return.

The operation of the solenoid operated valves, 161, 166, 176, 183, and 190, is effected in accordance with predetermined vertical extents of movement of the workhead by means of electrical switches positioned upon the stationary portion of the machine and cooperating with switch actuators carried by the workhead. These several switches are similar to those illustrated in the aforementioned Staples Patent 2,362,318 and are mounted for actuation in substantially the same manner. As hereinafter described, however, the switches are somewhat differently connected in a control circuit from that shown in the patent so as to effect different operations of the device.

As will be seen in Fig. 2, one side of the workhead D is provided adjacent the top thereof with a plate 198 having a plurality of substantially parallel, vertically extending slots such as 199. These slots are adapted to receive suitable studs such as 200 for adjustably securing switch operating cams or buttons to the plate 199 to actuate stationary switches carried by the upper portion C of the column of the machine, there being one switch positioned for cooperation with each cam in each individual slot, the several cams and switches being similar to those shown in Fig. 6 of Patent 2,362,318. As shown in Fig. 2 of the instant application, four slots 199 are provided so that there may be four switches each corresponding with one of the valves, such as 166, 176, 183 and 190. A fifth slot 201 is provided to permit the mounting of switch actuating buttons or cams for cooperation with an overtravel limit switch or switches adapted to be actuated in the event the workhead should travel beyond the ordinary permissible limits thereof due to a failure of some of the control mechanisms, this overtravel limit switch being connected, as hereinafter described, to interrupt the energization of the entire control circuit.

On the other side of the workhead, the latter is provided adjacent the top with switch actuating members which are similar to those shown in Fig. 1 of Staples Patent 2,362,318 for cooperation with switches 1LS and 2LS mounted upon the adjacent portion of the part C of the column and connected in the control circuit to effect control of the operation, as will be hereinafter understood. Adjacent the forward portion and at the right of the machine is a vertically extending standard or support 202, the upper end of which is provided with a control box 203 containing various operator actuated switches such as push button switches 204, 205, 206, 207, 208, 209, 210 and 211 and turn switches 212, 213. In addition, the side of the control panel or box 203 is provided with a turnable actuating handle 214 for operating a drum type selector switch 215, which is adapted to be positioned for effecting either automatic operation of the machine or selective manually controlled operations at either of the four different feeding rates of the workhead, this switch also being provided with a neutral or off position.

The connections of the several mentioned motors, switches, and the solenoids of the various valves are schematically illustrated in Figs. 12A and 12B which together represent a simplified control circuit for the machine with various conventional protective devices such as current overload switches, fuses and the like omitted. For clarity, the illustration of the circuit is in the form known as a "cross-the-line" type diagram in which the contacts of the relays are not in alignment with the operating coils thereof. The relationship of the several relay coils and the contacts operated thereby can be readily understood, however, by placing the key chart comprising Figs. 13A and 13B in vertical alignment and horizontally aligned with Figs. 12A and 12B, respectively. When thus arranged it will then be found that the relay coils represented in Fig. 13B are horizontally aligned with the corresponding coils in Fig. 12B and the contacts associated with a given relay coil are represented in vertical alignment therewith in Figs. 13A and 13B, these contacts being also horizontally aligned with their positions in the control circuit as illustrated in Figs. 12A and 12B. Figs. 14A, 14B and 14C, taken together, illustrate the same circuit in the form required by the Patent Office. An understanding of the circuit can best be had by describing the same with respect to a complete cycle of operation of the device, the description reading equally well on either representation of the circuit.

*Operation—automatic*

Three-phase electrical power, to operate the machine and the control circuit thereof, is supplied from power supply lines L1, L2 and L3 which are connected with the main power lines 216, 217 and 218 of the machine through a disconnect switch 219. The portion of the control circuit in which the relays thereof are disposed has its main energizing wires 220 and 221 connected to the terminals of the secondary 222 of a transformer T, the primary 223 of the transformer being connected between the main power lines 216 and 218 for the machine.

Let it be assumed that the apparatus is to be operated under automatic control. The operating handle 214 of the selector drum switch 215 is positioned in alignment with the indicium marked "Auto," thus positioning the switch 215 to interconnect its stationary contacts 215a and 215b with each other and also to interconnect its stationary contacts 215c, 215d, 215e with each other. This may be effected either by conductive strips or interconnected spaced contacts carried by the movable portion of the drum switch which engage the stationary contacts when the switch is actuated. As illustrated, the movable portion of the drum has movable contacts 215j, 215k, which are strapped together and adapted to respectively engage the contacts 215a, 215b. Likewise the contacts 215c, 215d, 215e are engaged, respectively, by movable contacts 215m, 215n, 215o which are strapped or connected together.

The several switch actuating studs or cams, such as 200, are adjusted within the slots 199 to positions corresponding with those at which feeding movement at the several different preselected rates is to be started. That is to say, the first stud or cam 200 is positioned within its slot so that when the workhead is at the vertical elevation corresponding with the desired start of feeding movement at the first rate of speed, the cam 200 actuates its associated switch to thereby operate the associated valve for supplying fluid to the lift cylinder 80 at the proper predetermined rate. The duration of the feeding movement at this rate is determined by the position of the next succeeding stud or cam 200 for actuating its switch and thereby energizing the associated valve to supply fluid to the cylinder 80 as the predetermined rate corresponding to the next rate of feeding of the workhead. The third and fourth cams or studs 200 are likewise positioned in accordance with the desired point at which feeding at the third and fourth rates are to begin. Also, the actuators for the switch 1LS and 2LS are positioned such that switch 1LS is actuated at either extreme of the normal range of movement of the workhead, while switch 2LS is actuated at a point corresponding with the desired end of the extent of vertical movement at rapid traverse of the workhead, which point is also the beginning of the movement of the workhead at the feeding rate.

With the machine thus set up, the operator moves the switches 212 and 213 to closed positions and closes the disconnect switch 219. Closing of switch 219 supplies electrical energy to the wires or lines 216, 217 and 218 and, through the transformer T, to the wires 220 and 221. Hence, when the operator next actuates the push button switch 208, see Figs. 12B and 14A, a circuit is closed from the wire 220 to the wire 221 through the stop switch 209 and the coil of a relay HY, energizing the latter. Consequently, the relay HY closes its normally open contacts HY1 which are bridged about the start switch 208 so that the relay HY remains energized after the push button of switch 208 is released. Relay HY also closes its normally open contacts HY2, HY3 and HY4 so that the power supply lines 216, 217 and 218 are connected with the leads for the hydraulic pump motor 121, energizing the latter which drives the pumps 122 and 123 thereby supplying fluid under pressure through the conduits 129 and 160. Since the switch 212 was closed by the operator, closing of the main switch 219 results in energization of a relay CT, Figs. 12B and 14A, through a circuit extending from the wire 220 through the switch 212 and the normally closed contacts D2 of relay D to and through the coil of the relay CT, the circuit being completed by the connection of the latter to the wire 221. The energization of the relay CT closes its normally open contact CT1 and CT2 thereby energizing the solenoid CTS of the valve 130 so that the latter is actuated to supply fluid under pressure to the tool or cutter tensioning cylinders 108, 109 in a direction such that the chains 106 and 107 tend to rotate the cutters in the same direction as that in which they are rotated when the workhead is elevated. It will be understood, however, that no actual rotation of the cutters occurs at this time, since the pinions 94 on the cutter shafts are in mesh with the racks 104 and the latter are held from movement at this time by virtue of the engagement of the rollers 105 in the cam slots 102, the workhead being stationary.

The operator next presses the start button 204. This closes a circuit from the control circuit power line 220 through the stop switch 205, switch 204, the normally closed contacts 5CR1 of relay 5CR, to and through the coil of a relay 1TS to the wire 221, thereby energizing the relay 1TS. At the same time the coil of a timing relay 1T is energized since it is connected in parallel about the coil of the relay 1TS. The energization of relay 1TS closes its normally open contacts 1TS1, thereby providing a holding circuit around the start switch 204 so that the relays 1TS and 1T remain energized after the button of switch 204 is released. Relay 1TS also closes its normally open contacts 1TS2 and 1TS3, thereby completing a circuit from the main power line 216 through the solenoid 1TSS of the valve 131 to the wire 218. Hence, the valve 131 is operated supplying fluid under pressure to one of the tailstock cylinders 34 thereby moving the tail center 33 thereof downwardly. Prior to operation of the switch 204, the operator will have placed a workpiece within the chuck H and in substantial alignment with the tail center 33 and hence the movement of the tail center causes the latter to engage a recess provided in the end of the workpiece thereby centering and supporting the latter. The above mentioned energization of relay 1T as the result of actuation of switch 204 causes this relay to close its contacts 1T1, thereby energizing a relay 1CK. The relay 1CK in turn closes its normally open contacts 1CK1, 1CK2 and 1CK3. Closing of the contacts 1CK1 bridges the contacts 1T1, while closing of the contacts 1CK2 and 1CK3 energizes the solenoid 1CKS of the chuck actuating valve 132 so that the latter is operated to supply fluid under pressure to the cylinder 22 which is associated with the chuck located below the tail center that has just been actuated. Hence, the chuck jaw members 28 are moved to work-gripping position with respect to the workpiece. Since the relay 1T is preferably a timing relay, the closing of its contacts and hence the operation of the chuck is delayed for a short time after operation of the tail center 33 to insure that the latter has properly centered the work before the jaws of the chuck are in firm engagement therewith. It is apparent therefore that a workpiece has been accurately and firmly supported in the machine by simply approximately positioning the workpiece and actuating a start button.

A second workpiece is supported for rotation with the other work spindle of the machine by placing the workpiece within the other chuck and actuating the button of start switch 206. This closes a circuit from wire 220 through stop switch 207, start switch 206, the normally closed contacts 5CR2 and through the coils of relays 2TS and 2T, in parallel, to the wire 221. The resulting energization of relay 2TS causes it to close its normally open contacts 2TS1 providing a holding circuit about the start switch 206. Relay 2TS also closes its contents 2TS2 and 2TS3 thereby connecting the solenoid 2TSS of valve 133 to the power lines 216 and 218. The valve 133 is therefore moved to admit fluid under pressure to the other tailstock operating cylinder thus moving the tail center into engagement with the workpiece. The simultaneous energization of the relay 2T closes its contacts 2T1 a predetermined time thereafter and this energizes the relay 2CK, see Figs. 12B and 14A. Energization of relay 2CK closes the normally open contacts 2CK1 thereof to provide a holding circuit for relay 2CK about the contacts 2T1. The contacts 2CK2 and 2CK3 are also closed thus completing a circuit from wire 216 through these contacts and the solenoid 2CKS of the valve 134 to the wire 218. This actuates the valve 134 to supply fluid pressure for operation of the second chuck in a work-gripping direction a predetermined time after the operation of the associated tail center.

The operator next presses start button 210, see Figs. 12B and 14B. This closes a circuit from the wire 220 through the previously-mentioned normally closed contacts of the overtravel limit switch OTL, see Figs. 12B and 14C, through the normally closed stop switch 211, through the contacts 215a and 215b which are now connected together by the interconnected movable contacts 215j and 215k of selector switch 215, and through the momentarily closed start switch 210, wires 224, 225, and through the normally closed contacts 1LS1 of the limit switch 1LS to a wire 226 and thence through the coil of a relay 1CR to the wire 221. The resulting energization of the relay 1CR causes it to close its contacts 1CR1 thereby providing a holding circuit for the 1CR relay around the start button 210 which may therefore be released. The 1CR relay also closes its contacts 1CR2 and 1CR3, thereby completing a circuit from the wire 216 through the solenoid 161A of the valve 161 to the wire 218. The energization of the solenoid 161A actuates the valve 161 to a position which supplies fluid under pressure from the conduit 160 to the conduit 163. At the same time, the relay 1CR opens its contacts 1CR4 but this has no effect on the control circuit except to act as a safety feature for preventing improper operation of other parts of the mechanism.

The actuation of the start button 210 has also energized the coil of a relay U through a circuit extending from that switch through the wires 224, 225, the closed contacts 1LS1, the wire 227, closed contacts 2LS1 of switch 2LS, wire 228, to and through the coil of the U relay to the wire 221. Energization of relay U closes its normally open contacts U1 and U2 thereby completing a circuit from the wire 216 to and through the coil of the solenoid 4FS, of valve 190, to the wire 218. The energization of the solenoid 4FS moves the valve 190 to a position such that the fluid under pressure from the conduit 163 is applied to the conduit 191 and thence through the metering valve 192 to the connection 84 at the bottom of the lift cylinder 80. Consequently, the lift piston 81 is moved upwardly at a relatively rapid rate, thereby elevating the workhead D at a correspondingly rapid rate, bringing the work-pieces to points adjacent the tools 96.

Movement of the workhead to this point results in operation of limit switch 2LS, thereby opening its contacts 2LS1 and closing its contacts 2LS2. Opening of the contacts 2LS1 deenergizes relay U, thereby opening the contacts U1 and U2 of the latter and hence deenergizing the solenoid 4FS for the valve 190 with the result that fluid pressure is no longer supplied through the latter to the lift cylinder. The fluid under pressure already present in the cylinder 80 cannot escape therefrom, however, due to the presence of the check valves, such as 194. Escape of the fluid under pressure through the check valve 197 is prevented since the valve 161 is so positioned that fluid under pressure is being supplied to the conduit 163 and the pressure therein is equal to or greater than that attempting to exhaust from the cylinder.

Closing of the contacts 2LS2 completes a circuit through the previously closed turn switch 213, see Figs. 12B and 14A, thereby energizing relay 6M. The energization of relay 6M causes it to close its normally open contacts 6M1, 6M2, and 6M3, thereby connecting the leads of the motor 118 to the power supply lines 216, 217 and 218. Consequently, coolant or cutting fluid is now pumped from the reservoir 116 in the base A of the machine and supplied to the tools and workpieces. The closing of the contacts 2LS2 also completes a circuit therethrough and through the wire 229 to the contact 215c of switch 215, which is interconnected with the contacts 215d and 215e by the engagement therewith of the movable interconnected contacts 215m, 215n, 215o by the initial setting of switch 215. Consequently, a circuit is completed from the wire 229 through a wire 230 to and through the coil of a relay AR to the wire 221 thereby energizing the relay AR so that the latter closes its contacts AR1, AR2, AR3 and AR4. At approximately the same time, or slightly before, the rapid traverse of the workhead was terminated by operation of switch 2LS, the switch 11LS was actuated by virtue of its operating stud 200 being carried into engagement with the switch by movement of the workhead. The closing of the contacts AR1 and AR2, together with the operation of the switch 11LS, completes a circuit from the wire 229 through the contacts 215c, 215m, 215n, 215o and 215e of selector switch 215 to a wire 231 and thence through normally closed contacts 13CR3, 14CR2, the now closed contacts AR1, wire 232, to and through the now closed contacts 11LS, AR2, and the coil of a relay RR to the wire 221 thereby energizing relay RR. Energization of relay RR closes its contacts RR1 and opens its contacts RR2. The closing of the contacts RR1 completes a circuit through the now closed contacts 2LS2 and the normally closed contacts 2CR1 to the wires 233 and 234 and thence through the coils of relay 3CR and 1M to the wire 221. Consequently, the relays 3CR and 1M are both energized.

The energization of relay 3CR causes it to close its contacts 3CR1 and 3CR2, thereby completing a circuit from the power line 216 through the solenoid 1FS, for the valve 166, to the wire 218. The energization of solenoid 1FS opens the valve 166 causing fluid under pressure to be supplied from the conduits 163 and 165 to the conduit 167 and thence through the metering valve 168 to the conduit 171 and the connection 84 for the lift cylinder 80. Therefore, fluid under pressure is now supplied at a rate determined by the setting of the metering valve 168 so that the workhead is moved upwardly at a first feeding rate.

Figure 4:
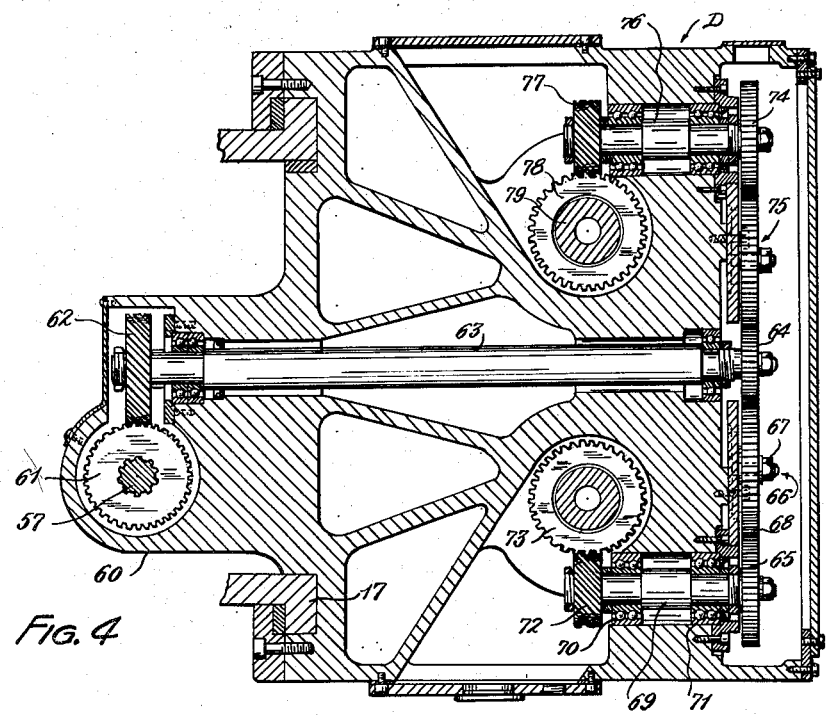
Fig. 4 is a fragmentary, horizontal sectional view taken approximately on the line 4—4 of Fig. 3 and illustrating a portion of the drive for the work spindles.
Figure 5:
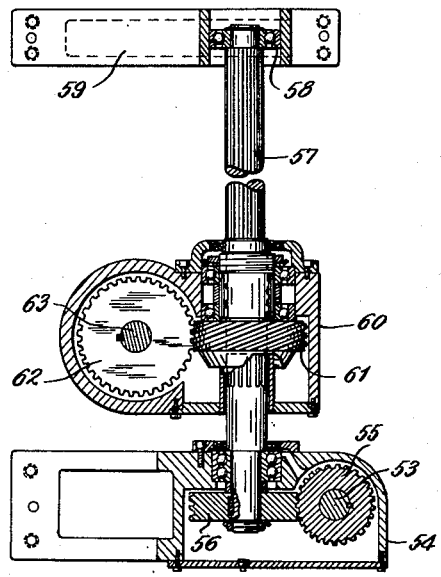
Fig. 5 is a detached view, partly in section and partly in elevation, illustrating another portion of the drive for the work spindles, the view being taken approximately on the line 5—5 of Fig. 3.

The energization of relay 1M has closed its contacts 1M1, 1M2, 1M3, and 1M4 in the energizing circuit for the spindle motor 51. As mentioned heretofore, this motor is of the three-phase, multiple predetermined speed type and, in the present instance, is adapted to be driven at four different predetermined speeds. For this purpose, the motor 51 has twelve windings, designated W1 to W12 inclusive, which are adapted to be connected, six at a time, in either a delta or a Y-type connection. Therefore, the closing of the contacts 1M1, 1M2, 1M3 and 1M4 energizes the windings W1 to W6 inclusive by connecting these windings to the power lines 216, 217 and 218, in a delta arrangement, the winding W1 being in series with winding W2, W3 in series with W4, W5 in series with W6 and each of these pairs of windings forming one leg of the delta. Consequently, while the workhead is moving upwardly at the first rate of feeding movement, the work spindles 18 and 79 are simultaneously rotated at a first rate of speed by the motor 51 which drives the spindles through the gearing previously described and which is illustrated in Figs. 4 and 5. At this time the work carried by the work spindles will be in machining relationship with respect to the tools carried upon the tool supports so that, as the workhead moves upwardly at the feeding rate, the cam rollers, such as 105, are actuated by the cam slots 102 thereby rotating the tool supports 92, and hence the tools 96 thereon, in timed relationship with the vertical movement of the workhead, so that the proper cutting surface on the tools 96 are brought into machining relationship with the workpieces.

It should be observed that the switch 11LS has its contacts closed by action of the cooperating stud or cam carried by the workhead for only a relatively short period of time, but nevertheless the workhead must continue its vertical movement at the first feeding rate, and the work spindles must be rotated at the corresponding first speed, for an interval of time determined by the length of a desired surface to be machined and this is normally a longer period of time than that during which the switch 11LS is held closed. Provision is therefore made for maintaining the operation after the contacts of switch 11LS open due to the cam or button moving therepast. For this purpose the contacts 3CR3, operated by the relay 3CR, are disposed to provide a holding circuit for the relays 3CR and 1M, this circuit extending from the closed contacts 2LS2 through wire 229, contacts 215c and 215m, which are in engagement and connected with the engaged contacts 215o and 215e, thence through the wire 231, and closed contacts 13CR3, 14CR2, AR1, 3CR3, and 2CR1 to the wire 221. Hence, the opening of the contacts 11LS which deenergizes the relay RR, thereby opening the contacts RR1, does not deenergize the relays 3CR and 1M.

When the workhead has been fed a predetermined distance corresponding to the predetermined extent of machining for the first operation, the button or cam actuator located in the second slot 199 in the plate 198 actuates its adjacent switch 12LS, closing the contacts thereof, see Figs. 12B and 14C. Since the relay AR is still energized, and the relay RR is now deenergized, closing of the contacts 12LS completes a circuit extending from contact 215e through the now closed contacts RR2, wires 235 and 236, normally closed contacts 13CR2, 14CR3, the now closed contacts AR3 and 12LS to and through the coil of relay 2CR to the wire 221. Energization of the relay 2CR opens its contacts 2CR1 in the previously mentioned holding circuit for relays 3CR and 1M, thereby opening the contacts 3CR1, 3CR2, 1M1, 1M2, 1M3 and 1M4. The opening of the contacts 3CR1 and 3CR2 deenergizes solenoid 1FS, thereby causing the valve 166 to close terminating the application of fluid under pressure to the lift cylinder 80 at the rate which is productive of the first rate of feeding movement of the workhead. Opening of the contacts 1M1, 1M2, 1M3 and 1M4 terminates energization of the spindle motor 51 at the first rate of movement thereof.

The relay 2CR has, however, also closed its contacts 2CR2, thereby closing a circuit extending from the energizing circuit for the relay 2CR to a wire 237 and thence through the coil of a relay 2M to the wire 221. Hence, the relay 2M is energized and closes its contacts 2M1, thereby completing a circuit through the now closed contacts 2CR2, wires 237 and 238, and the now closed contacts 2M1 to and through the coil of a relay 4CR to the wire 221. The resulting energization of relay 4CR causes it to close its contacts 4CR1 and 4CR2, thereby energizing solenoid 2FS which actuates the valve 176 for supplying fluid under pressure through the metering valve 179 to the lift cylinder 80 at a rate such as to cause the workhead to feed upwardly at the second rate of feeding movement thereof. The relay 4CR has also closed its contacts 4CR3, which are in parallel with the contacts 2CR2, and provide a holding circuit for the relays 2M and 4CR. Therefore, the relays 2M and 4CR remain energized even though the switch 12LS is opened shortly after the second rate of movement of the workhead begins, due to movement of the switch actuator therepast, with resulting deenergization of the relay 2CR and opening of its contacts 2CR2. The energization of relay 2M also closes its contacts 2M2, 2M3, 2M4 and 2M5 applying three-phase power from the power lines 216, 217, 218 to the windings W7 to W12 inclusive of the spindle motor 51, these windings being now connected in a delta arrangement so that the spindle motor drives the work spindles at a second predetermined rate of speed. As the workhead moves upwardly at its second rate of feeding movement, and the work spindles are rotated at a corresponding second rate of rotation, the tools 96 are rotated by the cam rollers 105 riding in the cam slots 102 so that a second machining operation is effected upon the workpieces and, when this operation has been completed, the workhead will have moved a sufficient distance so that the third stud or cam in the third slot, such as 199, actuates its adjacent switch 13LS closing the latter.

The closing of the contacts of switch 13LS closes a circuit extending from the contact 215e through the now closed contacts RR2, wire 235, wire 239, to and through the now closed contacts 13LS, and the coil of a relay 13CR to the wire 221. This energizes relay 13CR causing it to close its contacts 13CR1 and open its contacts 13CR2 and 13CR3. Opening of the contacts 13CR2 deenergizes the relays 2M and 4CR, thereby deenergizing the solenoid 2FS and terminating the energization of the spindle motor 51 for rotation at a second rate of speed. Therefore, movement of the workhead and rotation of the work spindles at the second rate is terminated. Simultaneously, the closing of the contacts 13CR1 completes a circuit from the wire 239 through the normally closed contacts 2CR3, 3CR4 and 4M1, to and through the coils of relays 3MCR and 3M, in parallel, to the wire 221.

The energization of relay 3MCR closes its contacts 3MCR1 and 3MCR2, thereby completing a circuit from the power line 216 through the solenoid 3FS to the power line 218 thus energizing the solenoid 3FS which actuates the valve 183 to supply fluid under pressure through the metering valve 186 to the lift cylinder 80, the rate of supply of the fluid pressure being such as to effect feeding movement of the workhead at its third predetermined rate. The simultaneous energization of the relay 3M has closed its contacts 3M1, 3M2, 3M3 and 3M4. Closing of the contacts 3M1 energizes a relay 3MC, which is thereby connected in parallel with relays 3M and 3MCR. The relay 3MC, in turn, closes its contacts 3MC1 which are in parallel with the contacts 13CR1. Likewise, the relay 3MC closes its contacts 3MC2, 3MC3, 3MC4, thereby connecting the windings W1 to W6, inclusive, of the spindle motor 51 with the power supply lines 216, 217 and 218. The operation of these contacts and of the previously mentioned contacts 3M2, 3M3 and 3M4 interconnect these windings to each other and to the power lines in a manner such that they provide a Y-connection so that the motor 51 operates the work spindles at a third predetermined rate of speed.

Shortly after movement of the workhead at the third rate of speed has begun, the switch 13LS will be opened, due to movement of the workhead, thereby deenergizing relay 13CR with consequent opening of the contacts 13CR1. The relays 3M, 3MC and 3MCR will, however, remain energized through the contacts 3MC1 so that the workhead continues to move vertically at the third rate of movement and the work spindles are rotated at their third rate of speed with the result that a third machining or cutting operation is performed and continues until the predetermined extent thereof has been substantially completed at which time the workhead has moved far enough so that the fourth stud or cam in the fourth slot 199 operates the adjacent switch 14LS. Since the relay 13CR was previously deenergized, the contacts 13CR2 are now closed. The contacts 2CR4 are also closed, since the 2CR relay remains deenergized. Moreover, the contacts AR4 are closed due to the continued energization of relay AR. Therefore, a circuit is completed, by the closing of the contacts of switch 14LS, through the previously mentioned contacts 13CR2, 2CR4, AR4, and 14LS, to and through the coil of relay 14CR to the wire 221. The energization of relay 14CR causes it to close its contacts 14CR1 and open its contacts 14CR2 and 14CR3. Closing of the contacts 14CR1 closes a circuit therethrough and through the normally closed contacts 4CR4, thereby energizing the relays 4M and 4MCR. Energization of relay 4M opens its contacts 4M1 thereby breaking the holding circuit and deenergizing relays 3M, 3MC and 3MCR, thus terminating the third rate of spindle rotation and the third rate of workhead movement.

The energization of relay 4MCR closes its contacts 4MCR1, completing a circuit through a wire 240, which is connected intermediate the contacts 14CR1 and 4CR4, to and through the contacts 4MCR1 and the coil of a relay 4MC to the wire 221. Hence, the relay 4MC is energized thereby closing its contacts 4MC1 thus providing a holding circuit for relay 4MC around the con-

17 tacts 14CR1. The energization of relay 4MCR also causes it to close its contacts 4MCR2 thereby completing a circuit from the now closed contacts 2LS2 and wire 229 through the contacts 4MCR2 to and through the coil of relay U to the wire 221. The U relay is therefore energized thereby closing its contacts U1 and U2 and thus completing a circuit from the power line 216 through the solenoid 4FS to the power line 218. The energization of the solenoid 4FS, which is the actuating coil for the valve 190, opens the latter and supplies fluid under pressure through the metering valve 192 to the lift cylinder 80 at the fourth rate so that the workhead moves upwardly at its fourth rate of feeding movement. The energization of relay 4M has effected closing of its contacts 4M2, 4M3 and 4M4, while the energization of relay 4MC has closed its contacts 4MC2, 4MC3, 4MC4. Hence, the spindle motor 51 has its windings W7 to W12, inclusive, Y-connected to the power lines 216, 217 and 218 providing a fourth speed of rotation for the work spindles so that the tools, such as 96, effect a fourth machining operation upon the workpieces.

As with the other machining operation, the switch 14LS, which initiated the fourth rate of feeding movement and spindle rotation, is released shortly after the fourth operation began, due to movement of the workhead, so that its contacts open with the result that relay 14CR is deenergized thereby opening the contacts 14CR1. Nevertheless, the relays 4M, 4MC and 4MCR remain energized through the now closed contacts 4MC1 so that machining operation at the fourth rate continues until completed, at which time a projection on the workhead engages and operates the limit switch 1LS. This opens the contacts 1LS1 and closes the contacts 1LS2 and 1LS3. Opening of the contacts 1LS1 breaks the main energization circuit extending therethrough and through which the relays 4M, 4MC, 4MCR were energized so that these relays are now deenergized with the result that they open their contacts controlling the energization of the solenoid 4FS and the supply of electrical power to the spindle motor. Hence, the rotation of the workpieces is terminated as well as travel of the workhead. Also, the energizing circuit for the relay 6M is broken with the result that the latter opens its contacts 6M1, 6M2, 6M3, deenergizing the coolant motor 118 and hence terminating the supply of coolant or cutting fluid to the tools and workpieces. Opening of the contacts LS1 has also deenergized relay 1CR causing the latter to open its contacts 1CR1 which provided the holding circuit around the starting switch 210.

The deenergization of relay 1CR has also closed its contacts 1CR4 and, since the contacts 1LS3 were closed by the operation of the switch 1LS at the completion of the upward movement of the workhead, a circuit is completed from the wire 220 through the overtravel limit switch OTL (see Figs. 12B and 14C), stop switch 211, and through contacts 215b, 215k, 215j and 215a which were interconnected by the prior setting of the switch 215, to a wire 241 thence through the contacts 1CR4 and 1LS3 to and through the coil of a relay 3T to the wire 221, thereby energizing the latter relay. The relay 3T is preferably a timing relay and hence a predetermined time after its energization it closes its contacts 3T1, energizing the relay 5CR. The energization of relay 5CR opens its contacts 5CR1 and 5CR2, thereby opening the energizing circuits of the relays 1TS and 1T and also opening the energizing circuits of the relays 2TS and 2T. The deenergization of the relays 1TS and 2TS cause them to open their contacts 1TS2, 1TS3, 2TS2, and 2TS3, thereby deenergizing the coils 1TSS and 2TSS so that the valves 131 and 133 controlling the application of fluid under pressure to the tailstock actuating cylinders now operate to supply fluid under pressure therethrough in the direction causing retraction of the tail centers from the corresponding workpieces.

The deenergization of the relays T1 and T2 cause the latter to open their contacts 1T1 and 2T1, respectively. This does not, however, deenergize the relays 1CK and 2CK since the holding contacts 1CK1 and 2CK1 of each of these relays remain closed and hence the workpieces are not released by the chucks with the result that there is no danger of the workpieces falling from the machine even though the operator be not present to remove them. However, when the operator is ready to remove the workpieces, he simply actuates the stop buttons 205 and 207, thereby breaking the circuits to the relays 1CK and 2CK deenergizing the latter. Deenergization of the relays 1CK and 2CK results in opening of contacts 1CK2, 1CK3 and 2CK2, 2CK3 thereby deenergizing the solenoids 1CKS and 2CKS with the result that the valves 132 and 134 are now operated to apply fluid pressure to the chuck actuating mechanisms in a direction moving the jaws of the latter to work releasing position. Hence the operator may easily remove the workpieces through the central opening F provided in the headstock without leaving his station adjacent the front of the machine. The aforementioned deenergization of the relays 1TS, 2TS, 1T, 2T, 1CK and 2CK has broken the holding circuits through the contacts 1TS1 and 2TS1, 1T1, 2T1, 1CK1 and 2CK1, so that release of the stop buttons 205 and 207 does not result in a reenergization of these relays and a corresponding reoperation of the chuck and tailstock mechanism. Moreover, the workhead remains at its upper position to which it has been actuated since the fluid pressure that has been supplied beneath the piston 81 in the lift cylinder 80 remains trapped therein due to the position of the valve 161 and the presence of the check valves 170, 181, 188 and 194.

When the workpieces have been removed at the completion of the machining operations, the cycle start switch 210 is again actuated, thereby completing a circuit therethrough and through the now closed contacts 1LS2 to and through the coil of relay D to the wire 221. This energizes relay D causing it to close its contacts D1 providing a holding circuit around the start switch 210, which may then be released. Since the contacts 1LS1 are now open, none of the relays effecting upward movement of the workhead or energization of the spindle motor 51 will be operated. The energization of relay D opens its normally closed contacts D2, thereby deenergizing the CT relay. This opens the contacts CT1 and CT2 deenergizing the CTS solenoid so that the valve 130 is positioned to supply fluid under pressure to the tensioning cylinders 108 and 109 in a direction relieving the pull upon the tensioning chains 106 and 107. Hence, the tool supporting spindles and tools may be freely rotated in the reverse direction during the subsequent downward return movement of the workhead.

Energization of relay D has also closed its contacts D3 and D4 thereby closing a circuit from the power line 216 through the solenoid 161B to the power line 218. The resulting energization of the solenoid 161B shifts the main valve 161, controlling movement of the workhead, in a manner such that the fluid pressure supply conduit 160 is now connected to the conduit 162 and hence to the upper end of the lift cylinder 80 above the piston 81, the lower part of the cylinder 80 being exhausted through the conduit 171, valve 197, conduits 196 and 163 since the latter is now connected through the valve 161 to the return conduit 164. Therefore, the workhead is moved downwardly at a relatively rapid rate which may be controlled, if desired, by the provision of a metering valve or the like in the conduit 196.

During this downward movement, the switch 2LS2 is engaged and actuated by a projection on the workhead thus resetting the switch so that its contacts 2LS1 are opened and its contacts 2LS2 are closed. These contact operations do not produce any operations of the mechanism at this time, however, since the contacts 1LS1 are open. However, the actuation of a switch 2LS2 is important since it resets the latter for a new cycle of operations. When the workhead has reached its lower or start position, the limit switch 1LS is engaged by its actuator and automatically moved back to its initial position, thereby opening its contacts 1LS2 and 1LS3 and closing its contacts 1LS1. Opening of contacts 1LS2 deenergizes the D relay, thus opening the contacts D3 and D4 and hence deenergizing solenoid 161B, so that the valve 161 is returned to its neutral position, thereby terminating the application of fluid under pressure to the upper end of the cylinder 80 and hence stopping the vertical movement of the workhead. Deenergization of relay D opens its contacts D1, breaking the holding circuit for the relay, and also closes the contacts D2 preparing the circuit for a new energization of relay CT. The opening of the contacts 1LS3 deenergizes relay 3T causing the latter to open its contacts 3T1 and consequently deenergizing relay 5CR. This causes the contacts 5CR1 and 5CR2 to close and prepares the circuit for a new operation of the chucks and tail centers when a new cycle of operations is to be started.

A new cycle of operations is initiated by again placing workpieces in positions to be held by the chucks and tail centers and actuating the several start switches as mentioned heretofore, whereupon the machine will continue to support the work and effect the several machining operations automatically, as described above. Preferably, the machine is employed in a manner such that a workpiece on one of the spindles receives a roughing cut during one operation and this workpiece is then transferred to the second spindle for a finishing cut of the same type as the first operation, while a new workpiece is applied to the first spindle. Due to the novel design of this machine, it is possible for the operator to properly position and remove workpieces with respect to both spindles without leaving his station adjacent the control switches of the machine and, moreover, the machining operations on both workpieces may be simultaneously observed. Furthermore, the machine is completely automatic in operation, when the selector switch 215 has been moved to the automatic position, so that the machine when once set up may be operated rapidly by inexperienced personnel whose only function is to place and remove workpieces and operate a relatively few push buttons.

The machine is preferably provided with various conventional safety features. For example, as mentioned heretofore, a workhead actuated switch OTL is provided between the wire 220 of the control circuit and the main cycle stop button 211. Consequently, if the workhead should overtravel its normal extent of movement for some reason, the overtravel limt switch OTL would be operated, by a projection or projections carried by the workhead, to open its contacts, thereby deenergizing the portion of the control circuit governing the vertical movement of the workhead and the rotation of the work spindles. The tail centers and work holding chucks would not be released, however, so that there would be no danger of the workpieces inadvertently dropping from the machine. Preferably, the power supply leads for the spindle motor 51 are provided with conventional current overload devices responsive to current flow therethrough and governing energization of the control circuit. Hence, excessive current flow in the spindle motor operates to terminate the entire operation of the machine. These overload devices and other safety switches have not been illustrated nor described in detail since they are conventional and operate in the usual manner. If it be desired to stop the machine at any time, the operator simply actuates the stop switch 211.

*Operation—manual*

The herein disclosed machine may also be operated under so-called "manual" control by positioning the selector switch 215 so that the handle 214 thereof indicates one of the manual positions, as, for example, the "1" position. In this setting, the movable contacts 215p1 and 215q1 respectively engage the stationary contacts 215a and 215b, these contacts being connected together by virtue of the connections between the contacts 215p1 and 215q1. Likewise, the interconnected contacts 215r1 and 215s are engaged with the contacts 215c and 215f thereby interconnecting the latter. The machine is otherwise prepared for operation, as before, by actuating start button 208, see Figs. 12A and 14A, thereby energizing the hydraulic motor 121. Also, the cutter tension switch 212 is actuated to closed position thus energizing the cutter tension solenoid CTS moving valve 130 to supply fluid under pressure to the two cylinders 108 and 109. Workpieces are supplied to each of the work spindles and the start buttons 204 and 206 are actuated, thereby causing the tail centers and chucks to center and firmly hold the work for rotation with the work spindles, these operations all being effected as previously described under automatic operation and simply represent the setting up of the machine. Also, as before, the actuator for the switch 2LS will have been set at a position such that this switch will be actuated when the workhead has moved sufficiently to bring the workpieces into machining cooperation with the tools.

The cycle start switch 210 is then actuated and, as described under automatic operation, a circuit is closed through the start switch 210 thus energizing relay 1CR. This circuit extends from the wire 220 through the normally closed OTL switch, stop switch 211, and the contacts 215a and 215b which have been interconnected by the engagement therewith of the interconnected contact 215p1 and 215q1 due to the initial setting of the selector switch 215 the circuit being completed through the switch 210, wires 224, 225, the now closed contacts 1LS1 of the travel limit switch, wire 226, and the coil of relay 1CR to the wire 221. Relay 1CR, when thus energized, closes its contacts 1CR1, providing a holding circuit around the start switch 210, and also closes its contacts 1CR2 and 1CR3 thereby energizing the solenoid 161A of the valve 161. The energization of relay 1CR has also opened its contacts 1CR4, thereby preventing any possible inadvertent deenergization of the tail stock and chuck mechanisms.

The energization of solenoid 161A has moved the valve 161 so that fluid under pressure is supplied from the conduit 160 to the conduit 163 and the closing of the start switch 210 has also energized relay U through the normally closed contacts 2LS1, the relay U remaining energized through the holding contacts 1CR1 of relay 1CR. Relay U, as before, closes its contacts U1 and U2, energizing solenoid 4FS thereby operating valve 190 to supply fluid under pressure to the lift cylinder 80 at a rate which effects a relatively rapid upward movement of the piston 81 and hence of the workhead, this continuing until the workhead is moved sufficiently to actuate the switch 2LS, thereby opening contacts 2LS1 and closing contacts 2LS2. Opening of the contacts 2LS1 deenergizes relay U and the latter, in turn, deenergizes solenoid 4FS so that the supply of fluid under pressure to the cylinder 80 through the valve 190 is terminated, thereby terminating the rapid traverse movement of the workhead. Closing of the contacts 2LS2 energizes the relay 6M, since the switch 213 was initially closed during the setting up of the machine, and the energization of relay 6M closes its contacts 6M1, 6M2, 6M3, thereby energizing the coolant or cutting fluid pump motor 118 to supply coolant or cutting fluid to the workpieces and tools.

Up to this point the operation is the same as was explained under the heading "Automatic" except for the initial positioning of switch 215. However, when the switch 2LS closes its contacts 2LS2, the relay AR is not now energized. Instead, closing of the contacts 2LS2 completes a circuit through the wire 229 and the interconnected contacts 215c, 215r1, 215s and 215f to a wire 243, thence through the normally closed contacts 2CR1 to the wires 233, 234, thereby energizing relays 3CR and 1M. The relay 3CR closes its normally open contacts 3CR1 and 3CR2, thereby energizing solenoid 1FS and operating the valve 166 to supply fluid pressure to the lift cylinder 80 at the first feeding rate thereof. The simultaneous energization of relay 1M closes its contacts 1M1, 1M2, 1M3 and 1M4 thereby energizing the spindle motor 51 in a manner such that its windings W1 to W6, inclusive, are connected to the power wires 216, 217, 218 in a delta arrangement, providing rotation of the work spindles at the first speed of rotation of the motor.

If the operator does nothing further with respect to the machine, the workhead will continue to move upwardly at its first rate of feeding movement and the work spindles will rotate at their first speed of rotation for the entire permissible vertical movement of the workhead, the cutters being actuated, as before described, by cooperation of the cam rollers 105 and the cam slots. As the workhead moves upwardly, the sequential actuations of the switches 11LS, 12LS, 13LS and 14LS have no effect on the machine since the circuits normally closed by these switches cannot be completed due to open contacts disposed therein as the result of the initial positioning of the selector switch 215. When the workhead reaches its uppermost position, the switch 1LS is operated by its actuator carried by the workhead, thereby opening its contacts 1LS1 and closing its contacts 1LS2 and 1LS3. Opening of the contacts 1LS1 deenergizes relays 3CR and 1M, thus terminating movement of the workhead and rotation of the work spindles, as before described. The workpieces may then be released from the workhead and the latter returned to its initial position by operation of the stop buttons 205, 207 and the cyclic start button 210, as previously described under the automatic operation.

If, instead of having the selector switch 215 set at the first manual position thereof, the latter should be set at the second manual position, the contacts 215a, 215b would be interconnected by the engagement therewith of the contacts 251p2 and 251q2, which are strapped together. Also, contact 215c would be in engagement with contact 215r2, while the contact 215t would be in engagement with contact 215g. Since the contacts 215r2 and 215t are strapped together, the operation of the machine would be the same as previously described except that upon opening of the contacts 2LS1, terminating rapid traverse movement of the workhead, and simultaneous closing of the contacts 2LS2, initiating feeding movement of the workhead, the relays 3CR and 1M would not be energized. Instead, the relays 2M and 4CR would be energized, with the result that the workhead would be moved upwardly at its second rate of movement and the work spindles rotated at their second speed of rotation through the circuits previously described under automatic operation.

Likewise, the position of the selector switch 215 at either its third or its fourth positions marked "Manual" would result in operation of the workhead and the work spindles at their third or fourth rates, respectively, as will be readily apparent from an inspection of the control circuit and the prior description of the operations.

When operating under manual control, it is, of course, not necessary that the workhead continue its entire upward movement at a single rate of feed. Instead, after the workhead has moved upwardly at a given rate of movement and with a given speed of rotation of the work spindles for a predetermined desired distance, the operator may actuate the stop button 211, thus terminating this movement. A repositioning of the selector switch 215 to any of the other manual positions thereof and depression of the start button 210 would then cause resumption of machining operations at the new rate determined by the new setting of the selector switch. It should be further noted that it is not necessary to actuate the selector switch successively through each of its several positions, that is to say, the first operation of the workhead under manual control may be, for example, effected with the switch 215 set at the third position thereof and the second operation may be effected with the switch set at the first position thereof or any other order of actuations may be employed.

*Summary*

It is now believed evident, from the above detailed description and the illustrations of a practical embodiment of the invention, that a machine constructed in accordance with this invention is extremely simple in operation and enables a plurality of machining operations to be effected simultaneously upon two different workpieces by a relatively unskilled operator who need only load and unload the work and actuate a few control buttons. Moreover, the machine is so constructed that the loading and unloading of the work as well as observation of the progress of the machining operations can all be effected from a single station in front of the machine and which is convenient with respect to the operational controls for the machine. Hence, it is no longer necessary for an operator to move about the machine to load and unload the several spindles thereof and observe their operation, nor is it necessary to employ a large turret type machine in order to enable single station operation when multiple spindles are employed.

While the operation of this machine has been described with particular reference to the use of a liquid under pressure for operating the chucks and tail centers and for effecting workhead movement, it will be appreciated that in certain instances air or other pressuring fluids may be employed. Moreover, many of the advantages of the instant invention are still retained even though the lifting of the workhead be effected by means other than a fluid pressure operated actuator and/or when mechanically operated chuck and tail center mechanisms are employed. Other variations and equivalent constructions in an apparatus embodying this invention will readily occur to those skilled in the art to which it pertains after having studied these drawings and description and, therefore, the illustrated machine should be considered simply as an example of one embodiment of the invention and the latter is not to be deemed limited to the exact details of construction disclosed herein.

Having thus described the invention, I claim:

1. In a machine of the character described, the combination of a pair of frame members, means slidably supporting one of said frame members upon the other, a work spindle rotatably supported upon one of said frame members with its axis extending parallel with the direction of sliding movement of said one frame member, means on said work spindle adapted to support a workpiece for rotation with said work spindle, a tool spindle rotatably supported by the other of said frame members with its axis of rotation angularly disposed to and offset from the axis of rotation of the work spindle, the said tool spindle being adapted to support a tool for rotation therewith and in machining relationship with a workpiece supported on said work spindle, means including an electric motor and interconnected gearing for rotating said work spindle, fluid pressure operated means including a piston and cylinder operatively connected with said frame members for producing relative sliding movement therebetween thereby causing relative movement between said work spindle and said tool spindle, means for supplying fluid under pressure at different predetermined rates to said cylinder including a means for providing fluid at a substantially uniform pressure, a plurality of valve means connected in parallel between said means for providing fluid under pressure and the said cylinder, the said valve means each including means to regulate the rate of delivery of fluid under pressure therethrough and means for selectively permitting or preventing the flow of said fluid, individual means for actuating each of said valve means, means for selectively operating said valve actuating means, and means for rotating said tool spindle in predetermined relationship with respect to said relative movement between said tool and work spindles.

2. In a machine of the character described, the combination of a frame, a workhead supported on said frame for vertical movement relative thereo, a work spindle rotatably supported on said workhead with its axis extending vertically, means on said work spindle adapted to support a workpiece for rotation with said work spindle, tool support means supported by said frame for movement relative to the axis of rotation of the work spindle, means including a multispeed electric motor and gearing interconnecting the motor with said work spindle for rotating the latter, fluid pressure operated means including a piston and cylinder operatively connected between said frame and workhead for effecting vertical movement of the latter, a source of fluid under pressure, a plurality of separate electrically operated valve means controlling the supply of fluid under pressure to said cylinder at different predetermined rates, electrical switches actuated by said vertical movement of the workhead at different preselected positions in that movement, an electric control circuit interconnecting said switches and valve means for effecting operation of the latter, means in said control circuit operatable substantially simultaneously with the operation of said valve means to energize said motor for operation at the speed thereof which is correlated to the rate of vertical movement produced by operation of any one of said valve means, and a manually operatable switch means in said circuit selectively positionable to either condition said circuit for sequential operation of said valve means in response to sequential actuation of said switches by vertical movement of said workhead or to condition said circuit for operation of a selected one of said valve means independently of the position of said workhead.

3. In a machine of the character described, the combination of a vertical frame, a pair of movable tool supports mounted in substantially horizontal alignment on the forward portion of said frame intermediate the top and bottom thereof, a workhead having upper and lower portions connected by spaced integral side portions thereby providing a rigid unitary member with a central opening, a plurality of vertically extending cooperating way means on said frame and workhead positioned above and below said tool supports and said central opening slidably supporting said workhead on said frame for vertical movement relative thereto, a pair of work spindles rotatably mounted on the said lower portion of the workhead on the side thereof adjacent said frame and positioned for access thereto through the said central opening from a position adjacent the front of said machine thereby facilitating insertion and removal of work, means for vertically moving said workhead comprising a piston and cylinder operatively connected between said frame and workhead, an electrical motor adapted to be operated at a plurality of different predetermined speeds and operatively connected to said work spindles for simultaneously rotating the latter, a control means selectively operatable for governing application of fluid under pressure to said cylinder at different predetermined rates and energization of said motor for rotation at predetermined speeds with each of said speeds relating to one of the preselected rates of supply of fluid to said cylinder whereby the speed of rotation of said spindles is correlated with the rate of movement of said workhead.

4. In a machine of the character described the combination of a vertical frame, a pair of movable tool supports mounted in substantially horizontal alignment on the forward portion of said frame intermediate the top and bottom thereof, a workhead having upper and lower portions connected by spaced integral side portions thereby providing a rigid unitary member with a central opening, cooperating vertically extending way means on said frame and workhead both above and below said tool supports and said central opening slidably supporting said workhead on said frame for vertical movement relative thereto, a pair of work spindles rotatably mounted on the said lower portion of the workhead on the side thereof adjacent said frame and positioned for access thereto through said central opening, a multispeed electric motor connected to said work spindles for simultaneous rotation thereof, a fluid pressure operated work holding means on each of said work spindles, a pair of fluid pressure operated tail centers respectively supported on the side portions of the workhead adjacent opposite sides of said opening with each center substantially aligned with a work spindle, a pair of rotatable tool supports carried by said frame and each adapted to support and rotate a tool in machining relationship with a workpiece supported by a tail center and the work holding means on the adjacent spindle, fluid pressure operated means for moving said workhead relative to said frame in a vertical direction including a cylinder and piston interconnected with said frame and workhead, means to rotate said tool supports in timed relationship with said workhead movement, a plurality of electrically actuated valve means for controlling the application of fluid under pressure to said cylinder at different selected rates and to the other of said fluid operated means at a single rate, electrical switch means interconnected with said motor and said valve means to control the selective operation thereof, and a control station comprising manually operatable means adjacent the said central opening for governing the actuation of said switch means.

References Cited in the file of this patent

UNITED STATES PATENTS

| | | |
|---|---|---|
| 2,118,020 | Curtis | May 17, 1938 |
| 2,362,318 | Staples | Nov. 7, 1944 |
| 2,450,096 | Siekmann | Sept. 28, 1948 |

FOREIGN PATENTS

| | | |
|---|---|---|
| 168,789 | Switzerland | July 2, 1934 |
| 461,915 | Great Britain | Oct. 2, 1936 |